(12) United States Patent
Schwab et al.

(10) Patent No.: US 12,433,292 B2
(45) Date of Patent: Oct. 7, 2025

(54) METHOD OF PRODUCTION OF CONTROLLED RELEASE SILICA NANOPARTICLES FOR PLANT GROWTH AND/OR DEFENSE ENHANCEMENT

(71) Applicant: ADOLPHE MERKLE INSTITUTE, UNIVERSITY OF FRIBOURG, Fribourg (CH)

(72) Inventors: Fabienne Schwab, Fribourg (CH); Mattia Maceroni, Geneva (CH)

(73) Assignee: Adolphe Merkle Institute, University of Fribourg, Fribourg (CH)

( * ) Notice: Subject to any disclaimer, the term of this patent is extended or adjusted under 35 U.S.C. 154(b) by 859 days.

(21) Appl. No.: 17/602,492

(22) PCT Filed: Apr. 16, 2020

(86) PCT No.: PCT/EP2020/060765
§ 371 (c)(1),
(2) Date: Oct. 8, 2021

(87) PCT Pub. No.: WO2020/212526
PCT Pub. Date: Oct. 22, 2020

(65) Prior Publication Data
US 2022/0202009 A1    Jun. 30, 2022

Related U.S. Application Data

(60) Provisional application No. 62/835,030, filed on Apr. 17, 2019.

(51) Int. Cl.
*A01N 25/28* (2006.01)
*A01N 59/00* (2006.01)
(Continued)

(52) U.S. Cl.
CPC .............. *A01N 25/28* (2013.01); *A01N 59/00* (2013.01); *A01P 21/00* (2021.08); *C01B 33/141* (2013.01);
(Continued)

(58) Field of Classification Search
CPC .......... A01N 25/28; A01N 59/00; A01P 21/00
See application file for complete search history.

(56) References Cited

FOREIGN PATENT DOCUMENTS

CN          108329109 A       7/2018
EP           3395876 A1      10/2018
(Continued)

OTHER PUBLICATIONS

Suriyaprabha et al., "Silica Nanoparticles for Increased Silica Availability in Maize (Zea mays. L) Seeds Under Hydroponic Conditions", 2012, Current Nanoscience, vol. 8, No. 6, pp. 902-908. (Year: 2012).*

(Continued)

*Primary Examiner* — Michael B. Pallay
(74) *Attorney, Agent, or Firm* — Hudak, Shunk & Farine Co. LPA

(57) ABSTRACT

A tunable one-pot method for producing nanoparticles for plant defense and growth enhancement that include components that collectively exhibit multiple release profiles of active ingredients when exposed to release conditions, such as contact with water, or sufficient moisture, or changes in pH, or the presence of plant roots. In a preferred embodiment, the method produces round or substantially round amorphous hydroxylated (and thus water soluble and low toxicity) nanoparticles having i) a silica-based core that exhibits a slow release rate and ii) silica mono- and/or oligomer based nanodomains and/or one or more active ingredients associated with the core, entrapped in nanopores or nanodomains, and/or adsorbed to the surface, etc., that (Continued)

Figure 1:
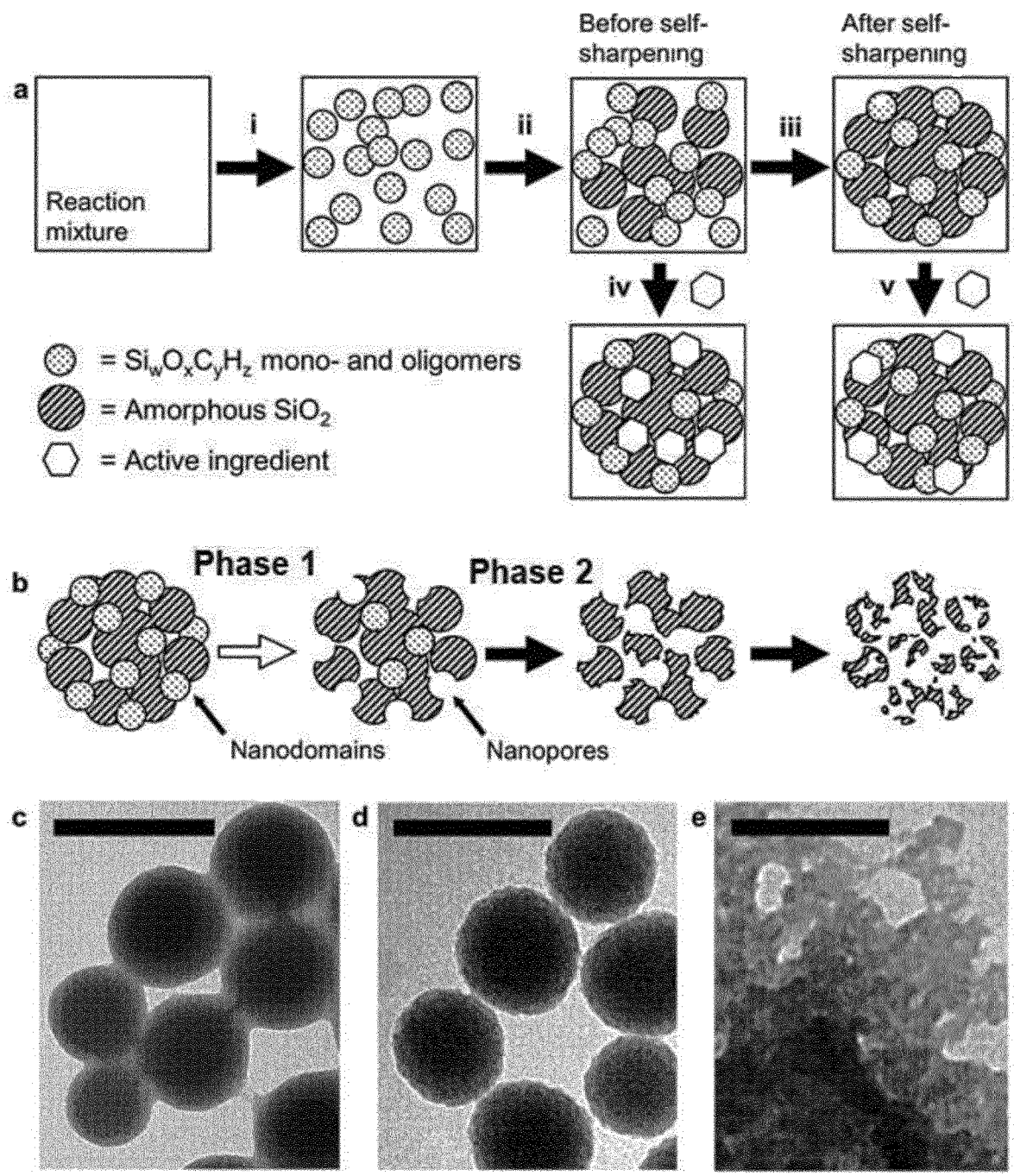

exhibit at least a second, faster release rate under release conditions, wherein the active ingredient includes one or more of a silica monomer and/or oligomer and/or additional active ingredients such as a pesticide, nutrient, prebiotic, or phytostimulant Methods for producing nanoparticles for agricultural use are disclosed, including colloidal synthesis steps that provide precise, tunable control of the architecture of the nanoparticles. Advantageously, the nanoparticles resulting from this process are suitable for use as plant growth and defense enhancers through delivery of the silica mono- and/or oligomers and/or active ingredients, by hormesis/plant nanopriming, or by mixture with conventional agrochemicals.

21 Claims, 11 Drawing Sheets

(51) Int. Cl.
 A01P 21/00 (2006.01)
 C01B 33/141 (2006.01)
(52) U.S. Cl.
 CPC ...... C01P 2004/04 (2013.01); C01P 2004/62 (2013.01); C01P 2004/64 (2013.01)

(56) References Cited

FOREIGN PATENT DOCUMENTS

| WO | 2016164987 | A1 | | 10/2016 | | |
|---|---|---|---|---|---|---|
| WO | WO-2017085636 | A1 | * | 5/2017 | ............. | A01N 25/08 |
| WO | WO-2018227240 | A1 | * | 12/2018 | ............. | C01B 32/15 |
| WO | 2019173542 | A1 | | 9/2019 | | |

OTHER PUBLICATIONS

Wang et al., Nanotechnology: A New Opportunity in Plant Sciences, Trends in Plant Science, 2016, pp. 1-14, Elsevier Ltd.
Torney et al., Mesoporous Silica Nanoparticles Deliver DNA and chemicals into plants, Nature Nanotechnology, May 2007, pp. 295-300, vol. 2., Nature Publishing Group.
Ely et al., Ostwald-Freundlich diffusion-limited dissolution kinetics of nanoparticles, Powder Technology, 2014, pp. 120-123, vol. 257, Elsevier B.V.
Vogelsberger et al., Dissolution kinetics of oxidic nanoparticles: The observation of an unusual behaviour, Colloids and Surfaces A: Physicochemical and Engineering Aspects, 2008, pp. 51-57, vol. 324, Elsevier B.V.
Schwab et al., Barriers, pathways and processes for uptake, translocation and accumulation of nanomaterials in plants—Critical review, Nanotoxicology, 2016, pp. 257-278, vol. 10, Issue No. 3, Taylor & Francis.
Rizwan et al., Effect of silicon on reducing cadmium toxicity in durum wheat (*Triticum turgidum* L. cv. Claudio W.) grown in a soil with aged contamination, Journal of Hazardous Materials, 2012, pp. 326-334, vol. 209-210, Elsevier B.V.
Ma et al., Silica uptake and accumulation in higher plants, Trends in Plant Science, 2006, pp. 392-397, vol. 11, Issue No. 8., Elsevier Ltd.
Croissant et al., Degradability and Clearance of Silicon, Organosilica, Silsesquioxane, Silica Mixed Oxide, and Mesoporous Silica Nanoparticles, Advanced Materials, 2017, pp. 1-51, vol. 29, (1604634), Wiley-VCH Verlag GmbH & Co. KgAa, Weinhem.
Tan et al., Effects of the exposure of Ti02 nanoparticles on basil (*Ocimum basilicum*) for two generations, Science of the Total Environment ,2018, pp. 240-248, vol. 636, Elsevier B.V.
Schaller et al., Silica uptake from nanoparticles and silica condensation state in different tissues of Phragmites australis, Science of the Total Environment, 2013, pp. 6-9, vol. 442, Elsevier B.V.
Reuzel et al., Subchronic inhalation toxicity of amorphous silicas and quartz dust in rats, Food and Chemical Toxicology, 1991, one page, vol. 29, Issue No. 5, Science Direct.
Savvides et al., Chemical Priming of Plants Against Multiple Abiotic Stresses: Mission Possible?, Trends in Plant Science, 2016, pp. 329-340, vol. 21, Issue No. 4., Elsevier Inc.
V.M. Gun'ko et al., Morphology and surface properties of fumed silicas, Journal of Colloid and Interface Science, 2005, pp. 427-445, vol. 289, Elsevier Inc.
Mebert et al., Nanoengineered silica: Properties, applications and toxicity, Food and Chemical Toxicology, 2017, pp. 753-770, vol. 109, Elsevier Ltd.
Zhang et al., Processing pathway dependence of amorphous silica nanoparticle toxicity—colloidal versus pyrolytic, Journal of the American Chemical Society, Sep. 26, 2012, pp. 15790-15804, vol. 134, Issue No. 38.
Schwab et al., Sorption kinetics and equilibrium of the herbicide diuron to carbon nanotubes or soot in absence and presence of algae, Environmental Pollution, 2014, pp. 147-153, vol. 192, Elsevier Ltd.
Adeleye et al., Influence of Extracellular Polymeric Substances on the Long-Term Fate, Dissolution, and Speciation of Copper-Based Nanoparticles, Environmental Science and Technology, 2014, pp. 12561-12568, vol. 48, ACS Publications.
Ler, et al., The Chemistry of Silica: Solubility, Polymerization, Colloid, and Surface Properties and Biochemistry of Silica, 1979, 790 pages, A Wiley-Interscience Publication, New York.
Coradin, et al., The silicomolybdic acid spectrophotometric method and its application to silicate/biopolymer interaction studies, Spectroscopy, 2004, pp. 567-576, vol. 18, IOS Press.
Xu et al., Increasing Surface Area of Silica Nanoparticles with a Rough Surface, Applied Materials and Interfaces, 2011, pp. 1865-1872, vol. 3, ACS Publications.
El-Shetehy et al., Silica nanoparticles enhance disease resistance in *Arabidopsis* plants, Nature Nanotechnology, Mar. 2021, pp. 344-353, vol. 16.
Suriyaprabha et al., Application of silica nanoparticles in maize to enhance fungal resistance, IET Nanobiotechnology, 2014, pp. 133-137, vol. 8, Issue No. 3, The Institution of Engineering and Technology.
Suriyaprabha et al., Silica Nanoparticles for Increased Silica Availability in Maize (*Zea mays*. L) Seeds Under Hydroponic Conditions, Current Nanoscience, 2012, pp. 902-908, vol. 8, Betham Science Publishers.
Slomberg et al., Silica Nanoparticle Phytotoxicity to *Arabidopsis thaliana*, Environmental Science & Technology, 2012, pp. 10247-10254, vol. 46, ACS Publications.
Stober et al., Controlled Growth of Monodisperse Silica Spheres in the Micron Size Range, Journal of Colloid and Interface Science, 1968, pp. 62-69, vol. 26.

* cited by examiner

METHOD OF PRODUCTION OF CONTROLLED RELEASE SILICA NANOPARTICLES FOR PLANT GROWTH AND/OR DEFENSE ENHANCEMENT

FIELD OF THE INVENTION

The present invention relates to a method for synthesizing a silica nanoparticle ($SiO_2$-NP) for plant growth and defense enhancement, in a one-pot reaction, that exhibits multiple release profiles of orthosilicic acid (a beneficial plant nutrient) due to special silica mono- and/or oligomer domains in or on the nanoparticle, and optional other active ingredients, when exposed to release conditions, such as contact with water or sufficient moisture.

Advantageously, the method is suitable to produce $SiO_2$-NPs for use as plant growth and defense enhancer through delivery of orthosilicic acid, the core-associated active ingredients by the effects of locally elevated exposure concentration and slow release, and/or a nanoparticle-specific plant priming effect. Plant priming, also known as sensitization or hardening, is defined here as any biotic or abiotic method or material that mildly stresses the plant which reinforces the plant's natural biochemical and/or physiological defenses to subsequent future biotic or abiotic stress.

In a preferred embodiment, the method produces $SiO_2$-NPs having i) a round or substantially round soluble silica-based core of a specific size that is water-soluble and exhibits a first release rate of the nutrient orthosilicic acid and ii) one or more active ingredients associated with the core, e.g. adsorbed, absorbed, incorporated, coated, entrapped, imbibed, that exhibit at least a second, faster release rate under release conditions, wherein the active ingredient includes one or more of a silica monomer and/or oligomer and an optional secondary active component such as a pesticide or nutrient.

The $SiO_2$-NPs resulting from this method can be mixed with other agrochemical compositions (e.g. by simple mixing or by coating, imbibing, or incorporating one on or in the other composition), to potentiate the effects of both the $SiO_2$-NP and the agrochemical composition.

Methods for producing the $SiO_2$-NPs are disclosed, including colloidal or precipitation-based synthesis steps that provide precise, tunable control of the architecture of the $SiO_2$-NPs and incorporation of silica mono- and/or oligomer and/or secondary active ingredient.

BACKGROUND OF THE INVENTION

Bulk silica is used in large scale industrial applications, such as cement manufacture or glass production. Bulk silica is highly water insoluble. With the advent of nanotechnology, the application range of silica has been widened to silica nanoparticles ($SiO_2$-NPs) for the use in e.g. the food and cosmetics industry, and new applications are under development such as the use of $SiO_2$-NPs as a delivery vehicle for active ingredients into plants, see Wang et al., Nanotechnology: A New Opportunity in Plant Sciences. *Trends Plant Sci.* 2016, and Torney et al., Mesoporous $SiO_2$-NPs deliver DNA and chemicals into plants. *Nat. Nanotechnol.* 2007, 2, (5), 295-300.

Due to the higher surface-to-volume ratio, the higher surface energy, and other more complex nanoparticle-specific physicochemical phenomena, nanoparticles of any material are generally more soluble than their bulk counterpart especially when they are concave (Gibbs-Thomson effect). Ely, D. R.; Edwin García, R.; Thommes, M., Ostwald-Freundlich diffusion-limited dissolution kinetics of nanoparticles. *Powder Technology* 2014, 257, 120-123. Vogelsberger, W.; Schmidt, J.; Roelofs, F., Dissolution kinetics of oxidic nanoparticles: The observation of an unusual behaviour. *Colloids and Surfaces A-Physicochemical and Engineering Aspects* 2008, 324.

Due to the relatively low acute toxicity and high natural abundance of $SiO_2$-NPs, and dissolution into orthosilicic acid which is a highly beneficial nutrient strengthening plants in many different ways, $SiO_2$-NPs are highly attractive for benign-by-design strategies in agriculture. Nano-agrochemicals promise higher efficiency than conventional pesticides, but much has to be learned about the specific gain of efficiency compared to conventional products, and the risk of directly applying such new types of plant growth and defense enhancers on agricultural soil. Schwab, F.; Zhai, G.; Kern, M.; Turner, A.; Schnoor, J. L.; Wiesner, M. R., Barriers, pathways and processes for uptake, translocation and accumulation of nanomaterials in plants—Critical review. *Nanotoxicology* 2016, 10, (3), 257-278.

Silicon is poorly bioaccessible for plants in its insoluble bulk silica state (e.g. quartz). Only the monomer orthosilicic acid is bioavailable for plants. Unfortunately, liquid orthosilicic acid rapidly polymerizes at close-to-neutral pH and at concentrations that are relevant for growers. For this reason it is difficult to apply because low doses only act for a short time, thereby require multiple applications, and high doses can quickly overdose and harm the plant. It is therefore cumbersome to prepare liquid orthosilicic acid fertilizers or hydroponic growth media without precipitation of the orthosilicic acid or poor bioavailability thereof. Other sources of orthosilicic acid such as diatomite provide only enough silicon to the plant when applied in tons per hectare or more, which is not economically viable. Rizwan, M.; Meunier, J.-D.; Miche, H.; Keller, C., Effect of silicon on reducing cadmium toxicity in durum wheat (*Triticum turgidum* L. cv. Claudio W.) grown in a soil with aged contamination. *Journal of Hazardous Materials* 2012, 209-210, (0), 326-334.

Therefore, a problem to be solved by the invention was to provide water-soluble, bioaccessible silica for plants that can enhance plants' growth and defenses against abiotic stresses such as drought, flood, cold, heat, UV irradiation, wind, and biotic stresses such as fungal infections or other pathogen attacks. The fact that the element silicon can strengthen plants is still relatively new. The mechanism appears to be by means of strengthening the plant cell walls and a broad number of complex other biochemical mechanisms described in detail in Ma, J. F.; Yamaji, N., Silicon uptake and accumulation in higher plants. *Trends in Plant Science* 2006, 11, (8), 392-397.

Initial attempts with commercially available diatomite, which contains amorphous silica micro- and nanoparticles, and is therefore believed to act as a source for silica for plants, show that a sufficient release of silica for plants only occurs at a concentration of 15 tons per hectare, which is not economically viable. Rizwan, M. et al. Effect of silicon on reducing cadmium toxicity in durum wheat (*Triticum turgidum* L. cv. Claudio W.) grown in a soil with aged contamination. *Journal of Hazardous Materials* 2012, 209-210, (0), 326-334. Another problem to be solved was therefore to find an amorphous nanoparticle that dissolves in a period that is relevant for plant growth.

A further problem was to provide a method to coat and/or entrap multiple different active ingredients for plants on and/or within the same nanoparticle, the nanoparticle core at least including bioaccessible silica, without the addition of environmentally problematic polymers or expensive chelating agents or cross-linkers.

Another problem was to provide a method that can produce $SiO_2$-NPs by as few synthetic steps as possible in a one-pot synthesis, because every additional reaction, purification, heating, or drying step produces a lot of additional waste, and costs time and material.

Another problem was to provide a method for producing nanoparticles exhibiting slow extended release of active ingredients over a period under average growing conditions to aid plant growth, which require more orthosilicic acid in the beginning of the growth period and less towards adulthood.

Still another problem was that the release of active ingredients should be consistent, with neither too much nor too little active ingredients being provided at one time.

Another problem was to find a method to produce a $SiO_2$-NP that only dissolves in contact with water or humidity during use, and not during storage in aqueous suspension (long shelf life). Many water-soluble metastable $SiO_2$-NPs dissolve or aggregate/rearrange within days when stored in aqueous suspension. Croissant, J. G.; Fatieiev, Y.; Khashab, N. M., Degradability and Clearance of Silicon, Organosilica, Silsesquioxane, Silica Mixed Oxide, and Mesoporous Silica Nanoparticles. *Adv Mater* 2017, 29, (1604634).

Yet another problem was to provide a method to produce nanoparticles that have low bioaccumulation potential due to the abovementioned potential of nanoparticles translocating into aboveground tissue of plants and accumulating in food.

Along the same line, another problem was to provide a method that produces nanoparticles that do not harm plants and/or soil microorganisms and/or humans as it was found previously. Aerosil®, for example, an amorphous fumed $SiO_2$-NP that was proposed by Schaller et al. to be used for plant nutrition, has been found by Reuzel et al. to exhibit a considerable toxicity to lung tissue. Tan, W. et al. Effects of the exposure of $TiO_2$ nanoparticles on basil (*Ocimum basilicum*) for two generations. *Science of the Total Environment* 2018, 636, 240-248. Schaller, J. et al. Silica uptake from nanoparticles and silica condensation state in different tissues of *Phragmites australis*. *Science of the Total Environment* 2013, 442, 6-9. Reuzel, P. G. J. et al. Subchronic inhalation toxicity of amorphous silicas and quartz dust in rats. *Food and Chemical Toxicology* 1991, 29, (5), 341-354.

And finally, a problem to be solved was to find a method to produce well dispersed $SiO_2$-NP suspensions that can be mixed with other active ingredients without causing precipitation in suspensions that can lead e.g. to nozzle clogging during spray applications.

SUMMARY OF THE INVENTION

In view of this background, many challenges were presented in the art that needed solutions.

The problems noted above and others are solved by the one-pot, toxic reactant-free synthesis process and design of the nanoparticles of the present invention, wherein a low toxicity, highly water soluble, tunable silica-based plant growth or defense enhancer is disclosed, which advantageously provides multi-stage release of one or more active ingredients. In order to be effective and provide beneficial aid to a plant and help it thrive and grow, the nanoparticles are specifically designed with, as elaborated further herein, one or more of, desirably two or more of, and preferably each of a particular particle size, (dual-phase) dissolution rate, water solubility, shape (roundness), porosity, hydroxy-lation, silica mono- and/or oligomer content, and percentage of other active ingredient(s) besides orthosilicic acid that is/are rapidly available to the plant.

In one aspect, the method provides silica-based nanoparticles for agricultural use, in particular $SiO_2$-NPs that have a core (domain A) that includes amorphous silica and possesses nanodomains (domain B), both internal and on the surface, which contain silica monomers and/or oligomers and/or other active ingredients as described herein. The core-active ingredient structure facilitates the slow multi-rate release of orthosilicic acid when the nanoparticles are exposed to release conditions and wherein the active ingredient is at least silica that is converted to orthosilicic acid.

In a further aspect of the invention, it is to be understood that the active ingredient(s) of the nanoparticle is/are associated with the core without the use of a fixant by a suitable mechanism, whether ab- or adsorbed on the core, covalently bonded, loaded, non-covalently bonded, trapped in a pore, enclosed in nano-domains, or otherwise in physical contact or bound by another active ingredient. During release conditions, each the active ingredient in the nanodomains (domain B) and the core (domain A) exhibit a distinct release rate, which varies depending upon the nature of the same. For example, an active ingredient such as a silica mono- and/or oligomer that can be partially covalently and partially non-covalently bound to the core is desorbed and/or hydrolytically cleaved from the nanoparticle, resulting in orthosilicic acid that is the bioavailable form of silicon to the plant. The release of the silica mono- and/or oligomer from the nanoparticles happens by hydrolytic cleavage of the silica oligomers and occurs at a faster rate than the conversion of the core to orthosilicic acid.

Likewise, other active ingredients will exhibit different release rates from the $SiO_2$-NPs depending upon their composition. Advantageously, the process producing the $SiO_2$-NPs allows a producer to control the amount of an active ingredient by modification of the self-sharpening time (defined here as the rearrangement and restructuring, and higher density particle formation time), which in turn allows for precise dosing or release at a desired rate to a plant, whereby over-application or under-application of an active ingredient can be avoided.

In another aspect, the $SiO_2$-NPs have a limited, narrow size range that leads to full degradability of the silica therein into long-term available orthosilicic acid and low bioaccumulation within a plant. These advantages are provided by a size range greater than 36 nm and less than 500 nm as measured for ~70 nm $SiO_2$-NPs according to transmission electron microscopy (FIG. 10), where no intracellular uptake into plants has been discovered during experimentation. Therefore, very little potentially problematic internalization potential into edible plant tissue exists compared to conventional approaches with smaller $SiO_2$-NPs. Within the indicated size range and given the amorphous highly hydroxylated molecular structure, the dissolution kinetics and degradation in water and in accidentally exposed non-target organisms including humans is expected to be excellent. In addition, according to the FDA, $SiO_2$-NPs are generally recognized as safe since more than 50 years; refer to Croissant, J. G. et al. Degradability and Clearance of Silicon, Organosilica, Silsesquioxane, Silica Mixed Oxide, and Mesoporous Silica Nanoparticles. *Adv Mater* 2017, 29, (1604634). Due to the nature of the $SiO_2$-NP structure, the silica core slowly degrades during and after release of the active ingredient eventually leaving nothing behind other than orthosilicic acid that can further benefit the plant during an extended period, and which is environmentally unproblematic. The minimum size of the nanoparticles is controlled to avoid crossing of cell wall, uptake into plant cells and translocation into aboveground tissue.

The $SiO_2$-NPs of the invention provide many additional advantages. They can help plant seedlings grow in the presence of high fungal infection pressure. In contrast to conventional fungicides such as tebuconazole, no adverse effect was observable on plant root development, and low toxicity was observed in non-target organisms like nematodes. The $SiO_2$-NPs can also boost biomass, and reinforce plant cell walls, which also increases the robustness of plants to biotic and abiotic stress including but not limited to bacteria, fungi, aphids and other small insects, drought, flood, UV radiation, heat, and cold. The germination speed of plants, and the number of successfully germinated seeds has also been increased with the nanoparticles of the invention. Germination rate in plant seedlings can be increased as well.

It is further advantageous that the nature of the nanoparticles themselves (not only the orthosilicic acid) exhibits a stimulating effect on the immune system of the plants (a nanopriming effect) that can be quantified, e.g., in terms of upregulation of systemic acquired resistance in the plant. This effect enhances the defense of plants against a multitude of biotic and abiotic stresses.

Additionally, the nanoparticles of the invention have a long shelf life when not exposed to release conditions, which is advantageous for transportation and long-term storage.

In still another aspect of the invention, the long-term release of orthosilicic acid means that fewer applications are necessary for a farmer. This saves time, money, and reduces soil compression on the field.

It is further advantageous that an active ingredient other than a silica-containing compound is included in the nanoparticles in some embodiments.

The nanoparticles resulting from the process must be large enough (optimally>36 nm) so there is no uptake into the plant cytoplasm and no translocation into aboveground tissue. The nanoparticles also need to be small enough (optimally<150 nm) so that they degrade in a reasonable period to prevent accumulation in soil, optimally a few months after the harvest.

BRIEF DESCRIPTION OF THE DRAWINGS

The invention will be better understood and other features and advantages will become apparent by reading the detailed description of the invention, taken together with the drawings, wherein:

FIG. 1 shows the nanoparticle synthesis and loading/unloading of the silica mono- and/or oligomers and/or active ingredients. The mechanism is based on the observations of the nanoparticles as observed by transmission electron microscopy in c and in FIG. 2-8 a: Nanoparticles form in the reaction mixture after coalescence of mono- and/or oligomers (i), silica primary particles (ii), and a self-sharpening step (iii). During (iv) or after (v) the self-sharpening step, an active ingredient or more silica mono- and/or oligomers can be associated with the particles. b: The oligomers are washed out first in presence of water by hydrolytic cleavage of orthosilicic acid (phase 1) and the silica core dissolves slower (phase 2). c-e: Visual evidence of the different steps of dissolution, see also FIGS. 2, 3, and 8.

FIG. 2 shows the physicochemical characterization of the silica nanoparticles ($SiO_2$-NPs) prepared. a-b: Transmission electron microscopy (median±standard deviation). Surface charge: average±standard deviation measured by dynamic light scattering. The particles in a are uncoated silica nanoparticles, the particles in b are coated with Si mono- and/or oligomers (here the active ingredient).

c: The coating of $SiO_2$-NPs with active ingredient leads to a significant increase in diameter. Statistical test: Mann-Whitney U, $p<0.001$.

d: Selected area electron diffraction of the $SiO_2$-NPs shown in b demonstrating the completely amorphous structure of the particles. The three diffuse diffraction rings are graphitic carbon signals by the support carbon film on the TEM grid. e: Attenuated total reflection Fourier transform infrared spectroscopy (FTIR) showing strong hydroxylation signals of $SiO_2$-nanoparticles in water (~10 g/L). The flat water spectrum confirms that the background correction was applied correctly to all samples.

FIG. 3 shows results of the KOH dissolution of $SiO_2$-NPs in samples. Transmission electron microscopy micrographs are shown. The micrographs of the incompletely digested $SiO_2$-NPs (middle and right micrograph) revealed the presence of nanopores compared to the original smooth $SiO_2$-NPs (left), suggesting that the nanoparticles do not dissolve homogeneously but that domains (pores) filled with silica mono- and/or oligomers dissolve first, and the glassy silica core of the nanoparticles dissolves second.

FIG. 4 shows the loading of an active ingredient on the $SiO_2$-NPs. The hydrodynamic diameter of $SiO_2$-NPs measured by dynamic light scattering increases when coated by another active ingredient (A.I.) by stirring the nanoparticles in a solution (mixing ratio 1:1) of the A.I. for 2 min ("0 h"), and overnight, respectively ("24 h"). The increase of the diameter of the particle corresponds to the thickness of the coating. The dynamic light scattering signal at 24 h also shows that the particles were well dispersed and miscible with the other A. I. Asterisks (*) denote statistically significant differences (Kruskal-Wallis, $p<0.05$, Bonferroni-corrected significances).

FIG. 5 shows two-phase dissolution kinetics of $SiO_2$-NPs. Different pH conditions show the release of orthosilicic acid from the nanoparticles: first fast release of Si mono- and/or oligomers, and then slow release of the silica core. The fitting parameters for the dissolution model are shown in FIG. 6.

FIG. 6 shows the fitting parameters for the $SiO_2$-NPs and as a reference for commercially available amorphous Aerosil® $SiO_2$-NPs. The dissolution data was fitted with the two-phase dissolution kinetics model and a conventional pseudo first-order kinetics model. The correlation coefficients $R^2$ demonstrate that the $SiO_2$-NPs of this invention clearly dissolve in two phases and not in one. FIG. 5 shows the corresponding raw data.

FIG. 7 illustrates transmission electron microscopy characterization of commercially available amorphous fumed (pyrolytic) Aerosil® $SiO_2$-NPs (Evonik, former Degussa). 0 h: In aqueous suspension before dissolution. Image adapted from Bossert et al., in preparation. 48 h: Aerosil® 48 h after dissolution in water at pH 11. The high pH was installed to accelerate the dissolution kinetics. Little changes in particle size are apparent. 72 h: Aerosil® 72 h after dissolution at pH 11 still show the presence of particles, demonstrating the slow dissolution of the particles. Scale bar: 100 nm.

FIG. 8 shows the more rapid dissolution of the amorphous $SiO_2$-NPs (right) compared to commercially available amorphous $SiO_2$ particles from diatomite (left). Both equally concentrated samples (10 g $L^{-1}$) were treated equally in 0.1 M KOH for 3 d to observe the accelerated hydrolytic dissolution, and then centrifuged in a conical tube for better visibility of the residue. Note the almost complete absence of dissolution in the commercial diatomite sample evident by the presence of a pellet.

Figure 9:
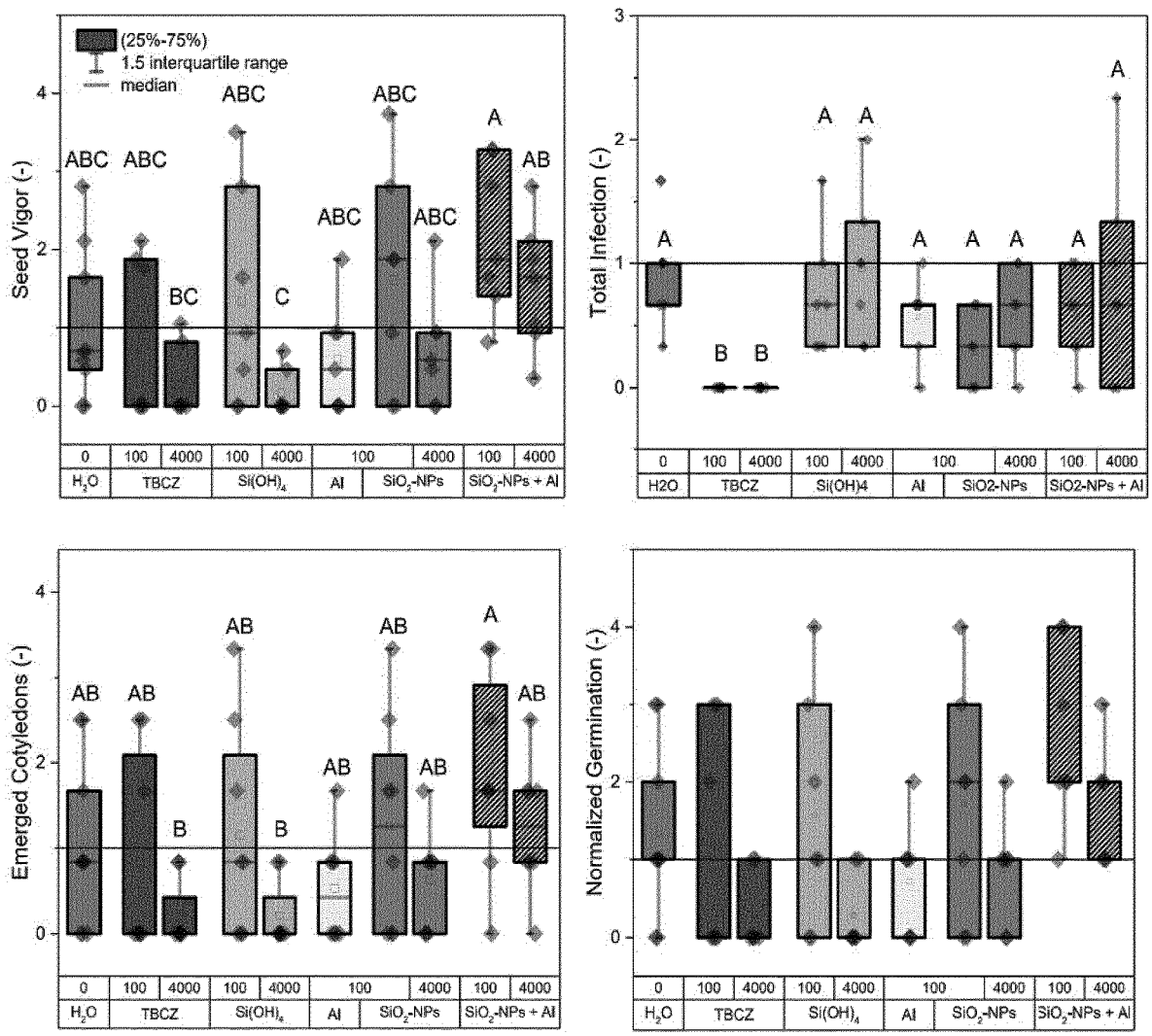

FIG. 9 shows alfalfa germination tests. In the seed vigor, infection, germination, and cotyledon results, the factor of increase or decrease compared to the average of the control (set to one and displayed as horizontal line) is shown. All endpoints except germination statistically significantly affected. 4000 ppm treatments showed some adverse effects in all treatments, especially for the broadband fungicide tebuconazole (TBCZ). The silica nanoparticles were less toxic to the seed than orthosilicic acid at same concentrations. Clear difference between nanoparticles loaded with active ingredient (A.I., here Si oligomers) and A.I. alone. Up to three times more seed vigor for nanoparticles and nanoparticles+A.I. Note that the highest seed vigor and and cotyledon emergence is present in 100 ppm of $SiO_2$-NPs coated with A. I., and that TBCZ at the same concentration had detrimental effects on the cotyledon emergence and germination.

Figure 10:
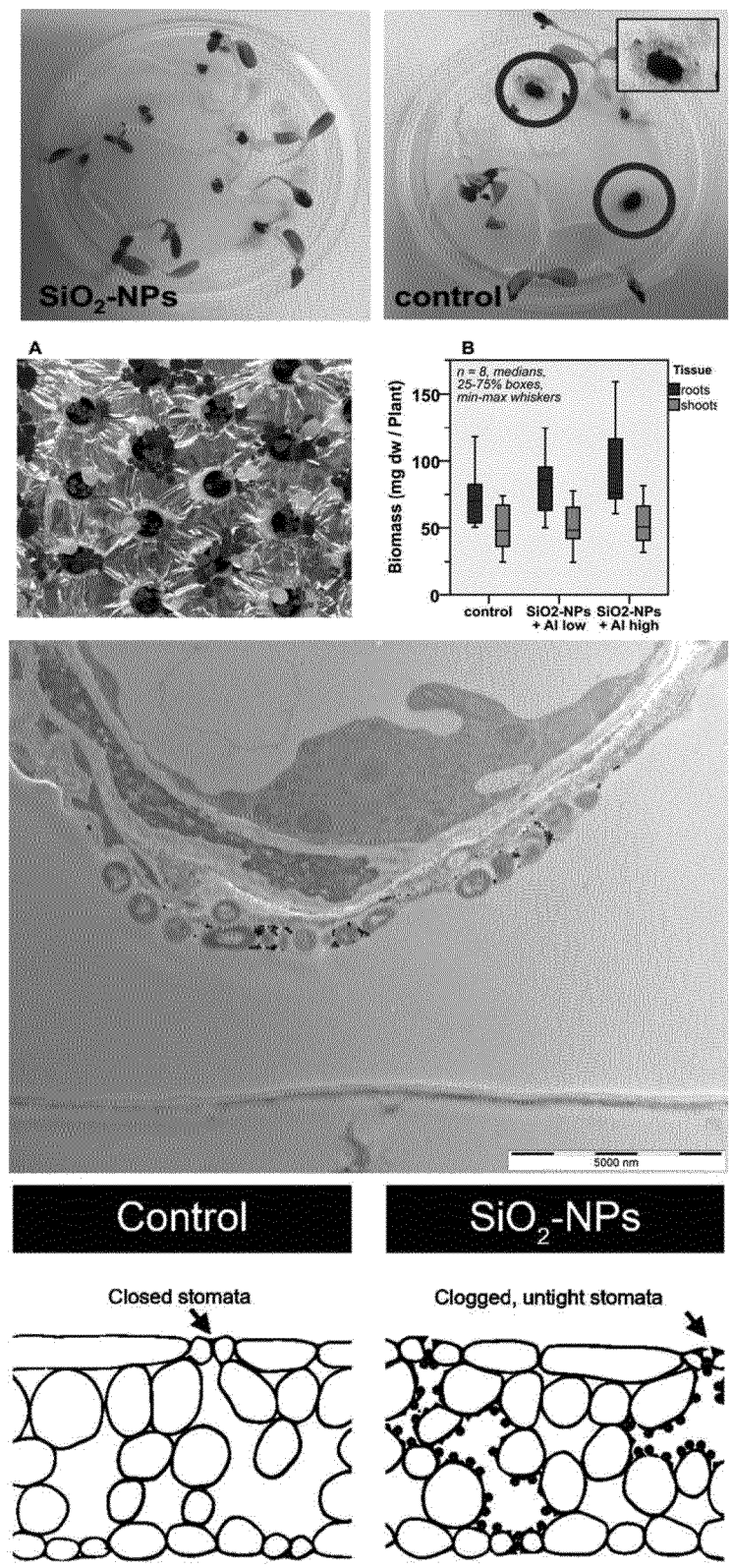

FIG. 10 shows alfalfa germination and soil growth tests, and transmission electron microscopy of the outermost surface of a plant root. For the soil growth tests, the biomass is shown. Less seeds observed with fungi were observed (reduction of approx. 10-100%). Active ingredient concentration-dependent increased biomass (15-19%) was observed in plants grown in soil. The micrograph shows the interaction of the nanoparticles with the plant root demonstrating no uptake of the nanoparticle into the plant, but adherence to the outermost mucilage layers of the root. The nanoparticles closely interact with the root rhizosphere where the dissolving orthosilicic acid is uptaken. Similarly, the illustration shows how the nanoparticles can interact with leaves causing close interaction with cell walls in extracellular leaf air spaces favouring targeted active ingredient release and/or mechanic interactions with the plant leaf.

Figure 11:
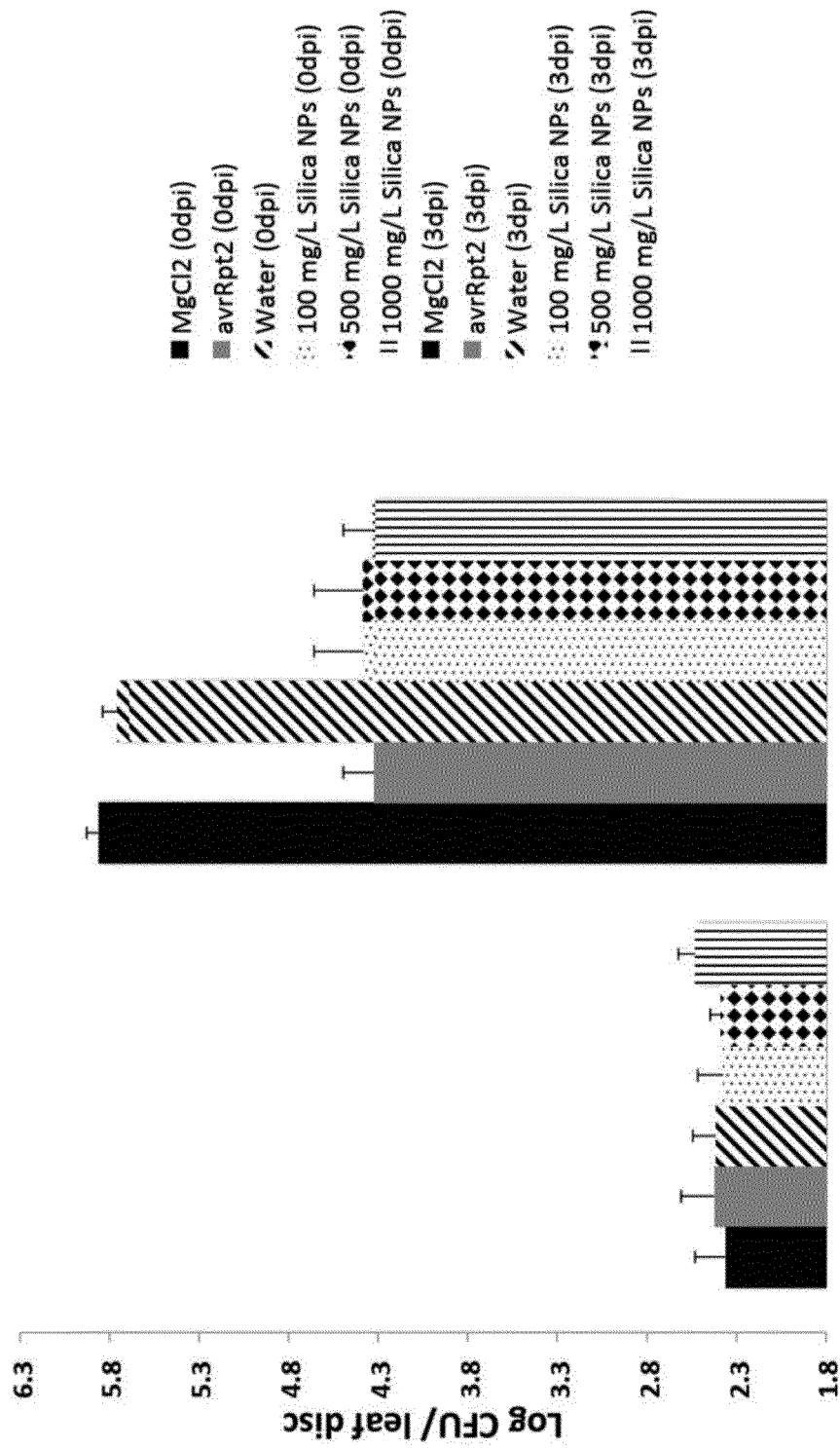

FIG. 11 shows *Arabidopsis* results using uncoated $SiO_2$-NPs demonstrate a nanopriming effect. The measured endpoint was infection of the plants with *Pseudomonas* as quantified by counts of fluorescent units (CFU) in leaf disks. The degree of infection was quantified at the timepoint of artificial infection (0 dpi) and 3 d post-infection (3 dpi). As a positive control, approx. 4 week old plants were infected with an *Pseudomonas* avrRpt2 mutant that is known to trigger systemic acquired resistance. Leaves of plants were infused with $SiO_2$-NP suspension, and in control plants with an equally concentrated $MgCl_2$ solution. In presence of pristine $SiO_2$-NPs, three days after infection there are more than 10× less bacteria on the plants.

DETAILED DESCRIPTION OF THE INVENTION

Methods are disclosed herein comprising the synthesis of $SiO_2$-NPs including a core and an active ingredient, the active ingredient comprising i) one or ii) two or more different components. The core exhibits a first release profile and any active ingredients exhibit additional release profiles, that are preferably different than the core release profile, when the $SiO_2$-NP is exposed to a release condition. The nanoparticles have a silica-based core that degrades in release conditions to orthosilicic acid.

As defined herein, the term "release condition" is an environment in which a component of the $SiO_2$-NP is separated from the $SiO_2$-NP itself in its original or a converted form. For example, in a release condition, the core of the nanoparticle including silica is hydrolytically degraded to orthosilicic acid and released from the nanoparticle. Similarly, silica monomers and/or oligomers that are active ingredients can be cleaved from the nanoparticles by hydrolysis, which also releases orthosilicic acid during release conditions. It is to be understood that release conditions can vary depending upon the components of the nanoparticles. Possible release conditions include, but are not limited to presence of water, ligands stabilizing the released molecules, moisture, exudates or other extracellular plant metabolites, and/or non-neutral pH conditions (optimally slightly acidic or basic).

In the context of this application, the expression "plant growth and defense enhancer" is understood as meaning that a plant in any growth stage starting from the seed to the adult plant can grow faster, and/or larger, and/or more rigid, and/or is indirectly favored due to higher robustness towards stress including but not limited to abiotic stress such as drought, flood, cold, heat, UV irradiation, wind, and biotic stress such as fungal, bacterial, and/or viral infections and/or other pathogen attacks.

"Active ingredient" preferably means an atom, ion, molecule, or macromolecule or similar substance with an effect that is directly or indirectly beneficial for plants. An active ingredient can for example be a nutrient (including the orthosilicic acid that is released from the nanoparticles) such as N, P, K, B, S, Ca, Mg, Na, V, Cr, Fe, Mn, Zn, Cu, Se, Mo, Ti; a phytostimulant, a prebiotic, a pesticide, or an otherwise biostimulative substance.

The term "active ingredient" also includes "pesticides", a term that in this context includes any substance with fungicidal, antiviral, nematocidal, insecticidal, bactericidal, or otherwise antibiotic action.

Manufacture of Nanoparticles for Plant Growth Enhancement

It has surprisingly been found that $SiO_2$-NPs synthesized using the method in this application provide a two-in-one silicon fertilizer and/or active ingredient release system that, during a release condition, exhibits at least two different release rates. Another surprising finding was the effect of the uncoated $SiO_2$-NPs triggering (i.e. priming) additional defense reactions (hormesis) in the plant. Plant priming has so far been demonstrated for some chemicals but not for nanoparticles, Savvides, A. et al. Chemical Priming of Plants Against Multiple Abiotic Stresses: Mission Possible? *Trends in Plant Science* 21, (4), 329-340. This presents a large number of advantages for the use of these nanoparticles for agricultural purposes:

At least one release rate is a relatively fast release rate that is provided during the high silicon and/or active ingredient demand germination phase of a plant and another, slower release rate is provided that continues through plant establishment where the silicon demand is lower.

In comparison to commercially available amorphous silica for agricultural purposes such as diatomite, the nanoparticles produced by the present method have a far larger surface-to-volume ratio, and due to their roundness a higher Gibbs-Thomson surface curvature effect, which, as we show here, both greatly accelerates their dissolution speed.

The nanoparticles can be produced in a one-pot synthesis without great expenses in terms of apparatus or material, which makes this method attractive for large-scale production as it is required for agricultural products, e.g. using a large batch or a micro- or macrofluidic setup.

The synthesis of the nanoparticles requires little to no heat.

When choosing suitable treatment such as washing and self-sharpening for example, the $SiO_2$-NPs can be used to entrap/imbibe another active ingredient without the use of additional crosslinkers or template molecules as outlined in detail below, making them an attractive carrier system for active ingredients and agricultural slow release applications.

In addition, when choosing suitable treatment, the method produces nanoparticles that are highly miscible with other agrochemicals.

A large number of active ingredients are available, so that depending on the purpose of the use, nematocides, fungicides or other plant nutrients could also be loaded (i.e. coated or imbibed) on and/or into the nanoparticles.

The method produces nanoparticles that exhibit very little toxicity to soil organisms and, the risk potential for humans is much lower compared to commercially available comparable nanoparticles due to the high hydroxylation and more rapid dissolution.

It has been found that the nanoparticles dissolve precisely in the time frame needed to act as a carrier for other agriculturally relevant active ingredients and then dissolve tracelessly to orthosilicic acid, and therefore have a very low potential for accumulation in the environment. In fact, the dissolution kinetics of the nanoparticles is similar to, or faster than, plant-based biomineralized silica that is omnipresent in foodstuffs.

All reagents to be used and the resulting nanoparticles can be stored relatively well at room temperature.

The slower release rate is generally associated with the core of the nanoparticles, which is converted to orthosilicic acid, a plant growth and defense enhancer, over time during release conditions. The core (domain A) release rate is referred to as the first release rate under a release condition for purposes of the invention. The first release rate releases nutrients for a period up to one month, up to 2 months or up to 18 months from application to one or more of a part of a plant and a growing medium containing the plant or a seed. Measured dissolution rates and half-lives calculated using equation 1 are provided in FIG. 6 with rates of commercial $SiO_2$-NPs (Aerosil®) as a comparison.

At least one second release rate, third release rate, etc., is provided by an active ingredient present in the nanodomains (domain B) of the nanoparticle. At least one active ingredient has a second release rate that is faster than the first release rate. When the active ingredient comprises a silica mono- and/or oligomer, the second release rate is adapted to provide nutrients to a plant during the germination phase with release of orthosilicic acid for a period up to 2 days, 7 days or 21 days, for example.

The active ingredient content of the nanoparticles is tunable in order to provide a desired release rate. Tunability is provided by the method for forming the nanoparticles. In particular, prolonging or shortening a self-sharpening step during which the active ingredients, e.g. silica monomers (i.e., orthosilicic acid) and/or oligomers, fill the pores of the core and adhere to the surface of the nanoparticle core produces tailor-made nanoparticles having desired properties. Still further, in another optional step of the method, the silica monomer and/or oligomer or other active ingredient can be removed from a nanoparticle by washing. Washing can be performed by, but not limited to, repeated dialysis using a 14 kDa semipermeable membrane, or centrifuging the nanoparticles at 15000× g for 20 min, removing the supernatant, redispersing of the nanoparticles in fresh water, and centrifugation, etc. It has to be noted that the dialysis is much more efficient in removing the silica mono- and/or oligomers or other active ingredients, especially when repeated four or more times for >6 h (time needed for a 14 kDa membrane, for another type of membrane the time may vary).

The active ingredient is present in the nanoparticle in a sufficient amount to have a desired beneficial effect on the plant. Active ingredient content and release rate thereof are tuned to provide desired effects. In order to provide a balance between short term and long-term benefits to the plant, it has been discovered that content of the active ingredient and/or silica mono- and/or oligomers should range between about 1 to 70 weight percent, desirably between 10 to 70 weight percent and preferably between 15 and 60 weight percent of the nanoparticle. In some embodiments, the active ingredient consists entirely of silica-containing monomer and/or oligomer.

As noted hereinabove, the controlled release silica-based nanoparticles resulting from the method are within a particular size range to provide degradability over a period of time as well as have low bioaccumulation within a plant (FIG. 10), and the ability to prime the plant defense due to the nature of the nanoparticles (hormesis). This effect has been observed for an optimal nanoparticle size for plant priming effect and dissolution rate that ranges from 1-500 nm in diameter, desirably from 20 to 200 nm in diameter and preferably from 40 to 100 or 150 nm in diameter as measured according to transmission electron microscopy.

The process utilized to create the controlled release silica-based nanoparticles produces nanoparticles that are spherical or substantially spherical in nature. These spherical or roundish nanoparticles are necessary to minimize potential toxicity of the nanoparticles.

The terminology used here for silica-based nanoparticles (silica nanoparticles, $SiO_2$-NPs) with different loading statuses of active ingredients and/or silica mono- and/or oligomers are as follows:

"Core $SiO_2$-NPs" for "naked" $SiO_2$-NPs (domain A) where practically all silica mono- and/or oligomers or active ingredient residues have been removed by rigorous leaching, for example, by soaking the $SiO_2$-NPs in a strong acid or base, and/or by simulating environmental conditions in a dissolution experiment as described in Example 3 below, and/or by prolonged residence time in the environment.

"$SiO_2$-NPs" or "uncoated $SiO_2$-NPs" for silica nanoparticles resulting from the synthesis, and after removal of the reaction byproducts, that were washed by at least one step of dialysis to remove the surface-bound silica mono- and/or oligomers. These $SiO_2$-NPs do still contain silica mono- and/or oligomers and/or active ingredients entrapped/imbibed in nanodomains (domain B).

"Active ingredient coated $SiO_2$-NPs" or "silica oligomer-coated $SiO_2$-NPs" for silica nanoparticles that were only purified by one to three steps of centrifugation to remove the reaction byproducts. These nanoparticles contain both silica mono- and/or oligomers and/or active ingredients entrapped/imbibed in nanodomains and a coating thereof on their surface.

Nanoparticle Core

Figure 2:
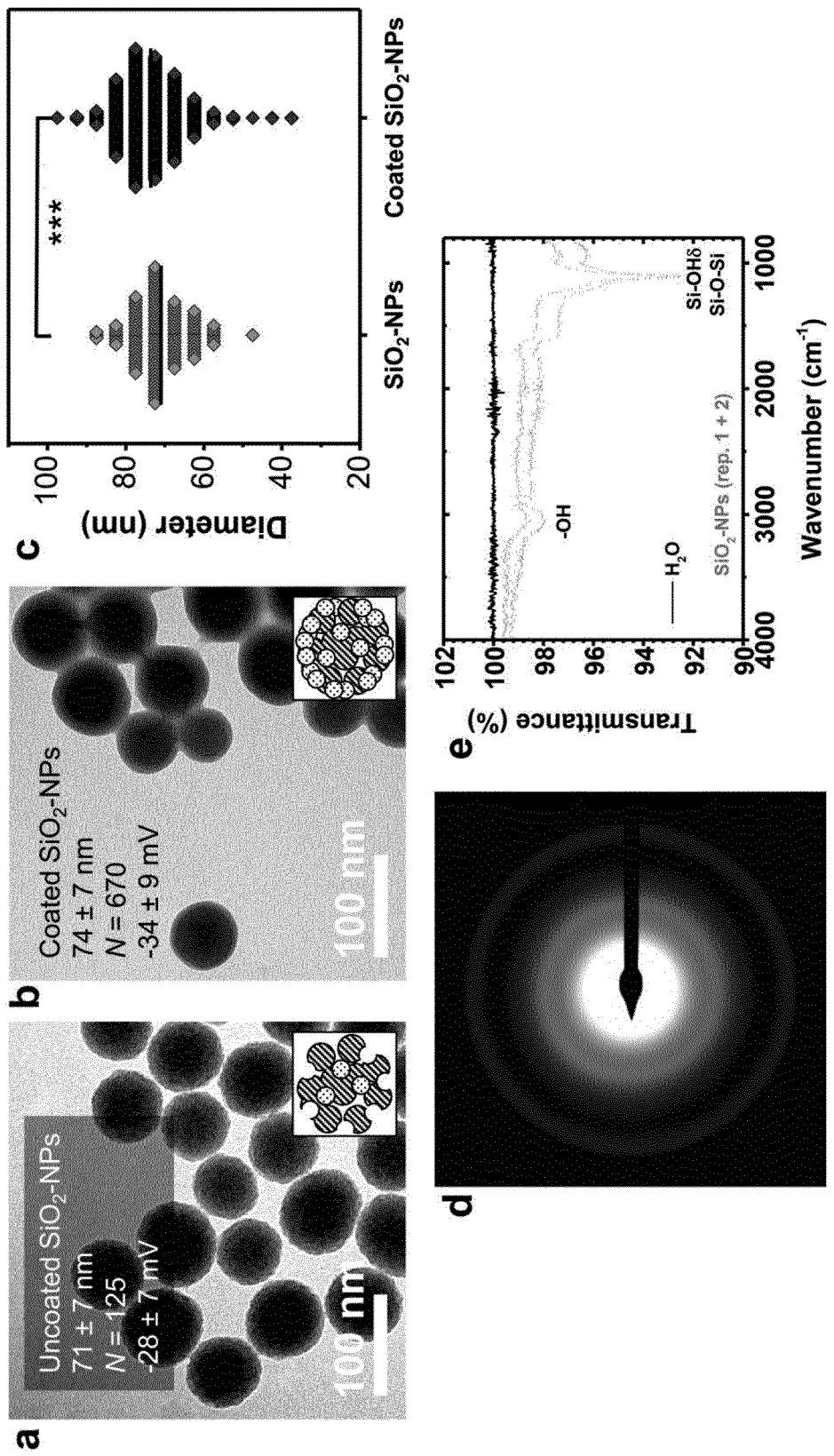

The nanoparticles include a round or substantially round core (domain A) that is silica-based and includes nanodomains (domain B) that are typically filled with silica mono- and/or oligomers and can be filled with further active ingredients (FIG. 1-2). When the nanodomains are hollow, which can for example happen if water has cleaved all the silica mono- and/or oligomers into orthosilicic acid, they are then termed "nanopores" in this application.

Besides serving as a vehicle for active ingredient transportation, the core itself is primarily amorphous and highly hydroxylated, and therefore advantageously degradable by neutral, or accelerated acid- or base-catalyzed hydrolysis over time under a release condition and provides orthosilicic acid, which can further benefit a plant during growth. Due to the small size, the primarily amorphous and highly hydroxylated nature, and the high surface area that results if all nanodomains are empty (FIG. 3), the core is more water soluble than other commercially available $SiO_2$-NPs such as e.g. Aerosil®.

Figure 3:
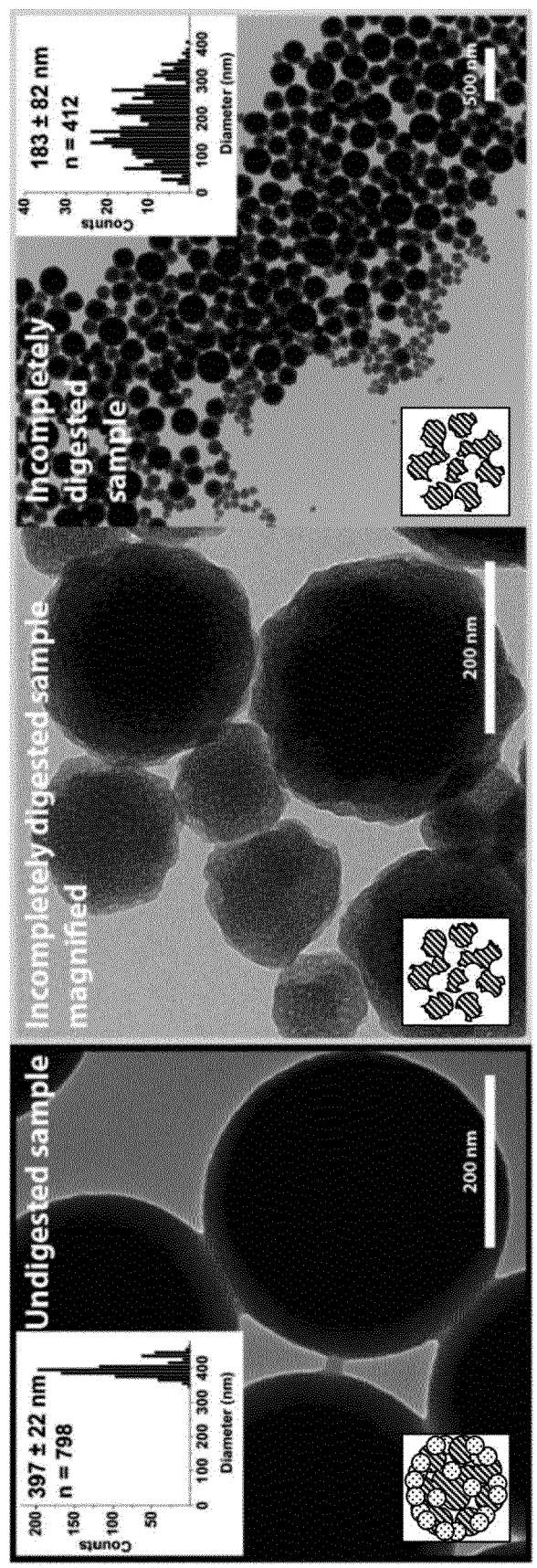

Due to the absence of a template molecule such as customary for the synthesis of mesoporous $SiO_2$-NPs (often termed "MSNs"), another type of commercially available $SiO_2$-NPs, the nanoparticle core described here can be produced in a one-pot synthesis that does not require an additional step to remove template molecules or add cross-linkers. The pore/domain size of the nanoparticle is 10 nm or smaller, as apparent from nanoparticles where the silica mono- and/or oligomers have been removed (FIG. 3).

It has been hypothesized that nanoparticles>36 nm may be prone to cross the plant cell wall and translocate into aboveground tissue of plants. This may lead to the undesirable presence of nanoparticles in food. Schwab, F.; Zhai, G.; Kern, M.; Turner, A.; Schnoor, J. L.; Wiesner, M. R., Barriers pathways and processes for uptake, translocation and accumulation of nanomaterials in plants—Critical review. *Nanotoxicology* 2016, 10, (3), 257-278. We tested this experimentally and found indeed no uptake for nanoparticles ~50-70 nm in diameter (FIG. 10). Therefore, the nanoparticles in this invention are advantageously>36 nm in diameter.

Nanoparticle Active Ingredient

The active ingredient of the nanoparticles is present and able to be released from the nanoparticle under release conditions at a release rate that is preferably relatively rapid as compared to the release rate of the silica-based core in order to provide a plant with a desirable active ingredient at an early stage of contact with a one or more i) a part of the plant and ii) a growing medium containing the plant or a seed that can germinate the plant, the seed optionally having a seedcoating.

The active ingredient includes at least one active ingredient that can be released from the nanoparticle under release conditions. Various different types of active ingredients are suitable depending upon the desired effect to be provided to a plant. Examples of suitable active ingredients include, but are not limited to, silica, orthosilicic acid, a silica oligomer, and other macro- or micronutrients such as one or more of N, P, K, B, S, Ca, Mg, Na, V, Cr, Fe, Mn, Zn, Cu, Se, Mo, Ti; a prebiotic, a phytostimulant, a biostimulant, an otherwise biostimulative substance; or a pesticide.

Advantageously, due to the one-pot synthesis of the nanoparticles and possibility to enrich nanoparticles with active ingredients in the nanodomains during or after the self-sharpening step, no additional fixant or carrier material is necessary to facilitate active ingredient association with the core of the nanoparticle. This does not exclude the possibility to add additional materials with these or other functions to the nanoparticles in this application, e.g. to enhance the stability of the nanoparticle in suspension, increase its adherence to the seed surface in a seedcoating, etc.

Preparation of Nanoparticles

Briefly, the method includes a polycondensation reaction on a mixture comprising precipitated orthosilicic acid or $Si:(OR)_4$ wherein R is an alkyl group, or a combination thereof, to form the core; accumulating the active ingredient on the core thereby forming the nanoparticles; and recovering the nanoparticles from the mixture. This method unexpectedly improves previous work (Stöber, W. et al. Controlled growth of monodisperse silica spheres in the micron size range. *Journal of Colloid and Interface Science* 1968, 26, (1), 62-69). It was surprisingly found that these nanoparticles contain a considerable fraction of silica mono- and/or oligomers. It was discovered that this silica mono- and/or oligomers are highly beneficial for plant growth. The following inventive steps were used to modify the prior method to produce the nanoparticles for agricultural purposes:

The ratio of the reactants was modified to obtain nanoparticles of a suitable size and composition.

The self-sharpening step was controlled to yield a specific silica mono- and/or oligomer content of the nanoparticles.

Ammonia was used instead of ammonium hydroxide.

Washing steps in water were added to remove the solvent and excess reactants, and to further control the silica mono- and/or oligomer content, and to produce nanoparticles without silica mono- and/or oligomers.

The final nanoparticles were coated with other active ingredients.

More specifically, in an initial part of the nanoparticle synthesis, one equivalent of tetraethoxysilane (tetraethyl orthosilicate, TEOS) or another alkyl orthosilicate is added to an equilibrated reaction mixture containing at least two equivalents of water, in a solvent such as ethanol under basic conditions. To provide basic conditions, a base such as ammonia or another amine base is utilized. In principle, other bases can be utilized as well. The reaction is preferably conducted with mixing under reflux and at a temperature that ranges between 5 and 95° C. The reaction is allowed to proceed for a suitable period, such as from about 10 min to about 24 hours, so that the alkyl orthosilicate monomers hydrolyze, condense to silica oligomers by polycondensation and then nucleate and then grow to form primary $SiO_2$-NPs that coalesce to form the core of an individual nanoparticle (FIG. 1). This reaction can also be conducted in a macro- or microfluidic setup where the system consists of at least a solution containing water and a Si-containing monomer, which is forced through one or several pores, or a porous membrane.

During an important part of the nanoparticle synthesis, an extended self-sharpening step is performed, wherein the active ingredient enriches on the core. This step which greatly improves the efficiency of the nanoparticles as silicon fertilizers is not performed in the manufacture of existing products containing similar $SiO_2$-NPs for agricultural purposes. During the core loading, self-sharpening step, residual free primary $SiO_2$-NPs and silica mono- and/or oligomers ad- and absorb to the silica core, making the nanoparticles smoother and rounder. It has been surprisingly found that these silica mono- and/or oligomers can act as active ingredients, because they can be hydrolytically cleaved to orthosilicic acid that is bioavailable for the plant.

Figure 4:
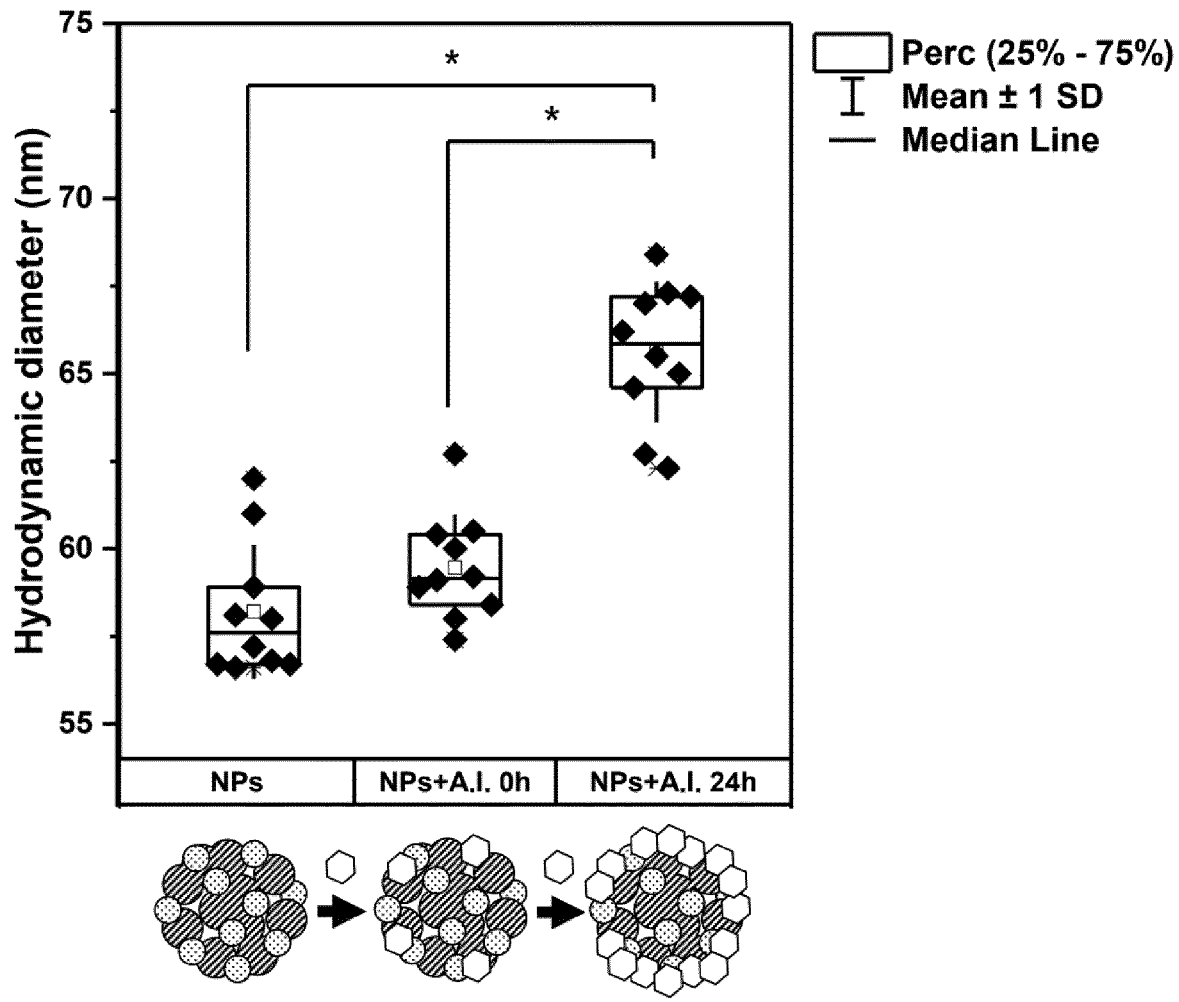

As illustrated in steps iii, iv, and v of FIG. 1, during or after a self-sharpening step, instead of or in conjunction with the loading of silica mono- and/or oligomers, loading with further active ingredients is performed, for example as mentioned herein by encaging alike the oligomers, see step iv, or by simple adsorption, see step v and also FIG. 4 for an example.

After the self-sharpening step, the nanoparticles can be washed to remove reaction byproducts and solvent, followed by centrifugation, one or more times. It was found that only centrifugation in water, but not in another solvent such as ethanol, of up to three times hydrolytically cleaves part of the superficial silica mono- and/or oligomers, but does not remove the silica mono- and/or oligomers entrapped in the inner pores of the nanoparticle (FIG. 1). The centrifugation washing process thus results in colloidal nanoparticles of a silica core coated with silica mono- and/or oligomers (i.e. silica oligomer-coated $SiO_2$-NPs) or an active ingredient (i.e. active ingredient-coated $SiO_2$-NPs). The centrifugation washing process is only required to remove the solvent used during the synthesis. If the solvent is water, then the nanoparticles do not need further cleaning.

The amorphous colloidal $SiO_2$-NPs produced by the precipitation-based wet synthesis of the present invention contain more low-energy bonds as compared to nanoparticle synthesized by, e.g. spray-flame synthesis (i.e. fumed or pyrolytic $SiO_2$-NPs), and are almost fully hydroxylated as compared to fumed $SiO_2$-NPs, as apparent from the strong vibrational peaks for —OH, Si—O—Si, and Si—OH in the Fourier-transform infrared spectroscopy (FTIR) in FIG. 2. The two bands of Si—H vibrations between 1010 and 700 $cm^{-1}$ that are typical in fumed $SiO_2$-NPs such as Aerosil® are clearly absent. For further reading about Aerosil® FTIR, refer to Gun'ko, V. M. et al. Morphology and surface properties of fumed silicas. *Journal of Colloid and Interface Science* 2005, 289, (2), 427-45.

The nanoparticles can be further fine-tuned as desired, such by performing one or more dialysis steps, or use sonication and repeated washing in water by centrifugation, to hydrolytically cleave active ingredients such as silica mono- or oligomers from the surface and outermost nanodomains of the nanoparticles.

Applications

It has been surprisingly found that the nanoparticles described herein are advantageously suitable for use as a plant growth and defense enhancer that can be applied directly to a plant or a medium, which contains a plant or a seed of a plant, the seed optionally comprising a coating. The nanoparticles degrade under release conditions and provide an active ingredient to the plant, preferably at a root level of the juvenile plant in an irrigated environment. The silica-based core provides a long-term supply of orthosilicic acid upon degradation. When the particles are loaded with silica mono- and/or oligomers, orthosilicic acid is provided by this second domain of silica (Phase 1, FIG. 1) as well, generally at a rate faster than the release rate of the core. In addition, when other active ingredients are utilized, additional compounds are provided to a plant, such as micronutrients, fungicides and biocides as described above.

The nanoparticles of the invention are produced utilizing a wet, colloidal synthesis. The wet process is required to form nanoparticles having active ingredients such as the silica oligomer, which are beneficial to plants and are useful at the root level of the plant in a growing environment, such as an irrigated environment, which provides release condition for the nanoparticles. The methods for producing the controlled release silica-based nanoparticles are generally shown in the scheme of FIG. 1 and above in the sections describing the nanoparticle synthesis.

Experiments

Materials, Chemicals, and Matrices

As a reference material, commercially available fumed (pyrolytic) $SiO_2$-NPs (Aerosil® 200, 98% silica, specific surface area of 200 $m^2 g^{-1}$) were purchased from Evonik (former Degussa). Fumed $SiO_2$-NPs are produced by a continuous flame hydrolysis, are non-porous according to the manufacturer and Mebert and co-workers, see Mebert et al., Nanoengineered silica: Properties, applications and toxicity. *Food Chem Toxicol* 2017, 109, 753-770, and less hydroxylated than colloidal $SiO_2$-NPs, see Zhang et al., Processing Pathway Dependence of Amorphous Silica Nanoparticle Toxicity: Colloidal vs Pyrolytic. *Journal of the American Chemical Society* 2012, 134, (38), 15790-15804. Diatomite powder (Starwax, France) was purchased from a local groceries store. All chemicals used were per analysis grade except stated otherwise. Water was pre-purified by a Milli-Q system (Milli-Q, 18.2 MΩ·cm arium 611DI, Sartorius stedim biotech, Germany). Dialysis membranes were purchased from Roth (Membra-Cel™, 14 kDa cut-off). Plasticware was used throughout all experiments to prevent contamination with silicon from glass.

EXAMPLE 1

Colloidal $SiO_2$-NP Synthesis

Colloidal $SiO_2$-NPs were synthesized via a co-condensation reaction as shown in the scheme of FIG. 1. Briefly, ethanol (81 mL, absolute, Honeywell), ammonia (2.93 mL, 25% aqueous solution, Merck), and water (29.0 mL) were mixed and heated to 70° C. in a three-neck flask containing a magnetic PTFE stir bar and heated by an oil bath. The mixture was stirred at that temperature for 40 min to equilibrate. Tetraethyl orthosilicate (10.0 mL, Sigma-Aldrich) was added and the mixture was stirred at 70° C. for three hours under reflux. The mixture was then allowed to cool to RT for ~1 h and the nanoparticles were washed three times by centrifugation (Thermo Scientific, F15-8×50cy fixed-angle rotor, 5000× g, 10 min) and redispersion in water. The final opaque $SiO_2$-NP suspension (~120 mL) contained colloidal silica oligomer-coated $SiO_2$-NPs, as determined by transmission electron microscopy and dynamic light scattering, at a concentration of 17.3 g silica $L^{-1}$ as determined gravimetrically. $SiO_2$-NPs with higher oligomer load were prepared by extending the self-sharpening time to 5 h.

The silica oligomer-coated $SiO_2$-NPs were further purified by at least five dialysis steps (6-24 h per step) to remove the oligomers on the surface resulting in uncoated $SiO_2$-NPs. The removal of the silica mono- and/or oligomers from the nanoparticle surface was confirmed by transmission electron microscopy showing electron-opaque matter in the silica oligomer-coated $SiO_2$-NPs, but not in the uncoated $SiO_2$-NPs, and by comparative measurements of silicon in ultrafiltrates (5 kD molecular weight cutoff) of oligomer-coated $SiO_2$-NPs and uncoated $SiO_2$-NPs. In the ultrafiltrates of the former suspensions, the silica concentration was 99±11 mg silica $L^{-1}$ (approximately the saturation limit of orthosilicic acid in water) compared to the latter suspensions that contained 10.5±0.1 mg silica $L^{-1}$. The residual free silicon in the uncoated $SiO_2$-NP ultrafiltrates is attributed to continuous hydrolytic orthosilicic acid cleavage from the inner encaged silica mono- and/or oligomer domains of the $SiO_2$-NPs.

Nanoparticle Characterization

All $SiO_2$-NPs were characterized by transmission electron microscopy (primary particle diameter), and dynamic light scattering (hydrodynamic particle diameter, surface charge). The results are summarized in FIG. 2. For transmission electron microscopy analysis, samples were prepared by diluting nanoparticle suspension (1 μL) with ethanol (5 μL, absolute, Honeywell) directly on the transmission electron microscopy grids (carbon film, 300 mesh on Cu, Electron Microscopy Sciences) and wicking remaining liquid using a fuzz-free tissue (precision wipes, Kimtech Science). The transmission electron microscopy analyses of the grids were performed on a FEI Tecnai Spirit (120 kV LaB6 emitter;

Veleta 2048×2048 wide angle detector) and image analysis was carried out using the FIJI software and the software Origin2016 (OriginLab Corporation, USA. The dynamic light scattering measurements were accomplished with samples diluted with water (1% v/v) and measured on a Brookhaven Particle Size Analyzer Plus90 (USA) (scattering angle 90°, 1 min acquisition, 10 repetitions).

EXAMPLE 2

Digestion Tests to Analyze Structure of Incompletely Digested $SiO_2$-NPs

To further illlustrate the dissolution mechanism of $SiO_2$-NPs, KOH was used to partially degrade larger $SiO_2$-NPs (397±22 nm in diameter) by accelerated alkaline-catalyzed hydrolysis. A $SiO_2$-NP suspension (2165 μL of a 23.1 g silica $kg^{-1}$ suspension, equivalent to 50 mg of $SiO_2$) was weighed into the PTFE microwave vessels and a KOH solution was added (10 mL, 48 mM final concentration in digestate). The mixtures were sealed and digested in a laboratory microwave. The digestates were visualized using transmission electron microscopy to characterize the undigested $SiO_2$-NPs, see FIG. 3.

EXAMPLE 3

Dissolution Mechanism Experiments—Materials and Methods

To illustrate the dissolution kinetics of $SiO_2$-NPs at agriculturally relevant conditions, the release of orthosilicic acid from the nanoparticles was quantified in a centrifugation setup described in detail below. Similar setups based on centrifugation and filtration have been used previously to quantify the release of pesticides from carbon nanotubes under non-equilibrium conditions in Schwab, F. et al. Sorption kinetics and equilibrium of the herbicide diuron to carbon nanotubes or soot in absence and presence of algae. Environmental Pollution 2014, 192, (0), 147-153 and in Adeleye, A. S. et al. Influence of extracellular polymeric substances on the long-term fate, dissolution, and speciation of copper-based nanoparticles. Environ Sci Technol 2014, 48, (21), 12561-8. A series of blanks (water only) and one dissolved silicon control (orthosilicic acid solution) were run in parallel to monitor the background silicon and potential silicon losses of the experimental setup. The nanoparticles were characterized at the beginning and at the end of the experiment by transmission electron microscopy and dynamic light scattering as outlined in detail in the nanoparticle characterization section.

During the dissolution kinetics assay, the $SiO_2$-NPs were suspended in water at known concentration at different pHs (4, 7, and 11) and kept under agitation. The high pH 11 was chosen because the known fast base-catalyzed hydrolytic degradation of silica in this pH range allowed the observation of full dissolution in a reasonable amount of time Iler, R. K., *The Chemistry of Silica: Solubility, Polymerization, Colloid and Surface Properties and Biochemistry of Silica*. Wiley: New York, 1979. The low pH of 4 was chosen to quantify the dissolution rate at a rhizosphere-relevant pH. At determined time points, and before saturation of the water with orthosilicic acid, the suspensions were centrifuged at 15 000× g and the supernatant was replaced with fresh water to mimic natural depletion occurring under non-equilibrium conditions in the environment. The cumulative silica concentrations in the collected fractions of supernatant were measured after filtration of potential residual nanoparticles to assess the nanoparticle dissolution and its rate.

The silicon quantification in the supernatants of the dissolution experiments was accomplished using a commercially available colorimetric silicate test kit (photometric 0.011-10.70 mg/L $SiO_2$ 0.005-5.00 mg/l silicon Spectroquant®, Merck Millipore, Switzerland) following an overnight digestion at room temperature of 200 μL supernatant in 3.0 mL 0.1 M KOH. Further reading about this assay is available from Coradin, T. et al. The silicomolybdic acid spectrophotometric method and its application to silicate/biopolymer interaction studies. Spectroscopy 2004, 18, (2004), 567-576. Certified reference element standards (TraceCERT®; Si, 975 mg $kg^{-1}$ in 2% NaOH, Sigma-Aldrich) were diluted in KOH 0.1 M at known concentration to obtain the calibration curve.

To demonstrate the dissolution of silica mono- and/or oligomers from the surface of oligomer-coated $SiO_2$-NPs (5 hrs of self-sharpening), the said particles were visualized by transmission electron microscopy before and after five steps of dialysis, each>6 h, in water (FIG. 2).

Results and Discussion of the Dissolution Experiments

Figure 7:
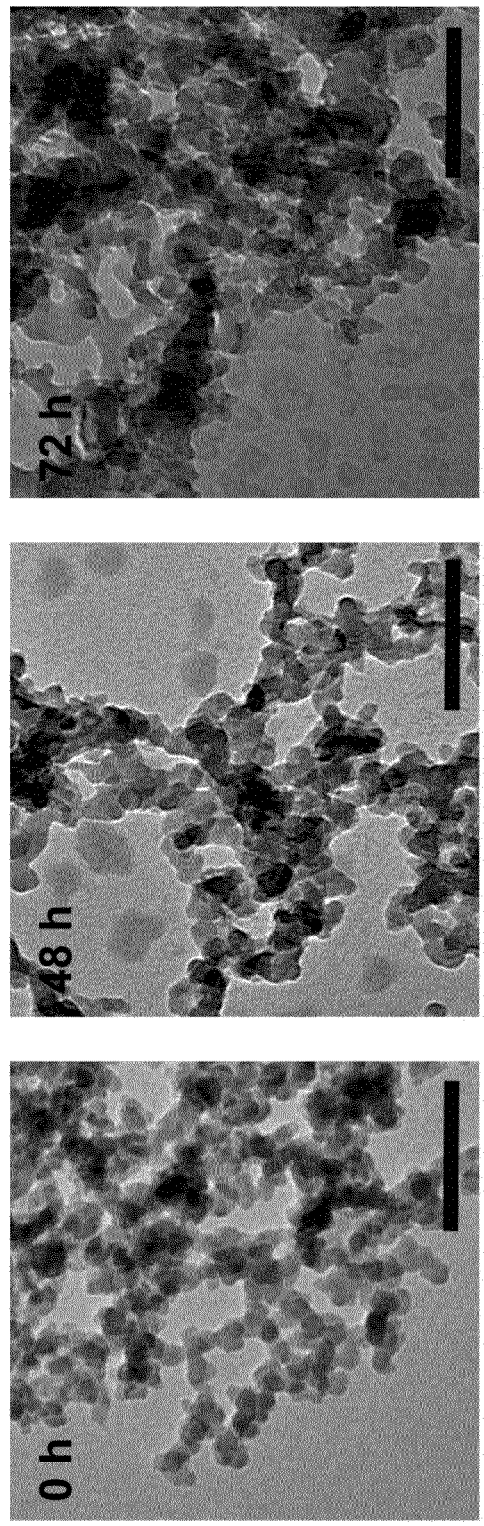
Figure 8:
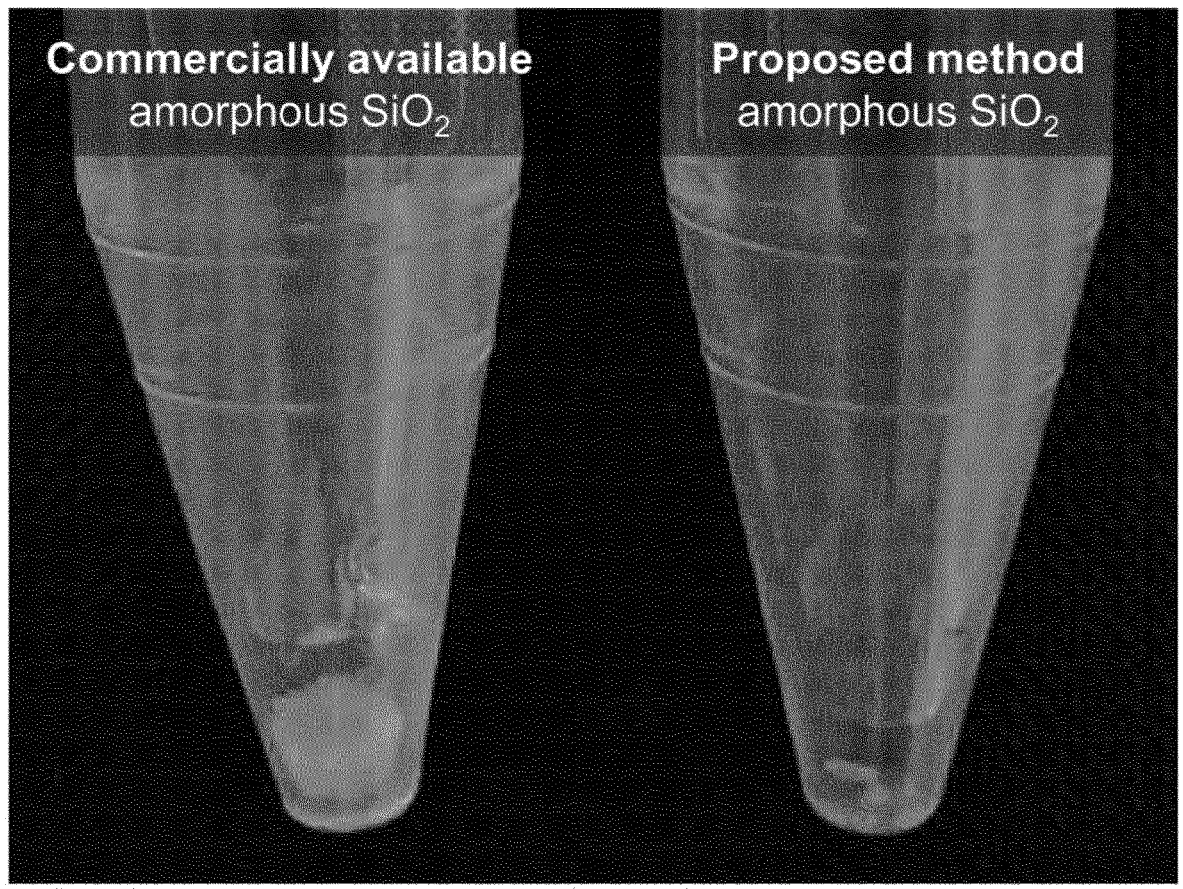

The nanoparticle dissolution was confirmed macroscopically by visual inspection of potential nanoparticle pellet residues after centrifugation (FIG. 8), and microscopically by transmission electron microscopy at the beginning and at the end of the experiment, showing a shrinkage of the nanoparticles accompanied by agglomeration or aggregation of the nanoparticles that eventually disappeared (FIGS. 1 and 7).

Figure 5:
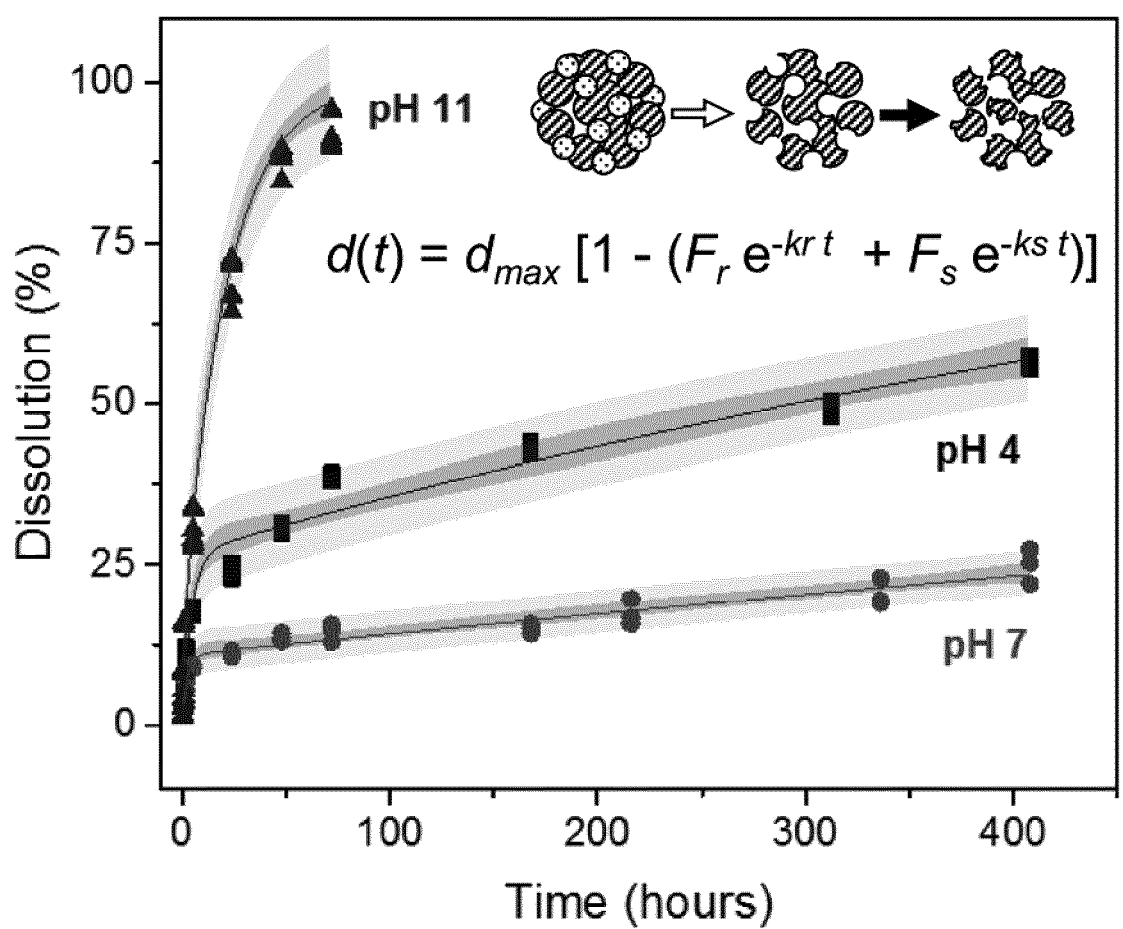

The dissolution setup was then used to quantify the dissolution kinetics in a range of environmentally relevant pH conditions (4, 7, and 11). The cumulative dissolution kinetics of the $SiO_2$-NPs is shown in FIG. 5 and the fitting parameters of a two-phase and a pseudo first-order kinetics model are presented in FIG. 6. The absence of a diffusion-limiting membrane allowed direct measurements of the unlimited dissolution rate. The dissolution kinetics reveals the two most important differences between the $SiO_2$-NPs in this application and commercial $SiO_2$-NPs (Aerosil®): First, the two-phase kinetics model shown in Equation 1 excellently fitted to the dissolution kinetics of the $SiO_2$-NPs ($R^2$=0.946–0.986). The first-order kinetics model, on the contrary, fitted poorly for the $SiO_2$-NPs produced by the method in this application ($R^2$=−0.093–0.894), but better for the Aerosil® $SiO_2$-NPs. This suggests that the dissolution of orthosilicic acid for the $SiO_2$-NPs here indeed is different from the commercial Aerosil® and occurs in two steps (corresponding to Phase 1 and Phase 2 in FIG. 1) with two rate constants $k_r$ ($h^{-1}$) and $k_s$ ($h^{-1}$) corresponding to two fractions of rapidly and slowly dissolving silicon ($F_r$, the silica mono- and/or oligomers, domain B; and $F_s$, the silica core, domain A, respectively), according to the two-phase first-order kinetics model:

$$d(t)=d_{max}[1-(F_r e^{-k_r t}+F_s e^{-k_s t})]. \qquad (1)$$

Figure 6:
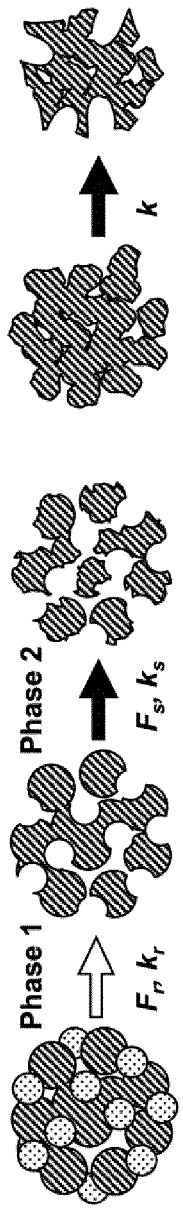

Second, the $SiO_2$-NPs in the present application dissolve by a factor of 2.3 to 2.5 times faster than the commercially available Aerosil® $SiO_2$-NPs (FIG. 6). These results confirm the transmission electron microscopy observations in FIGS. 1 and 7, explain the cumulative dissolution profiles in FIG. 5, and demonstrate that the nanoparticles produced using the presented method can supply the plant, at rhizosphere relevant pH of 4, with approx. 10-30% of their orthosilicic acid within the 50 h of release (the germination phase, where the plant needs high amounts of Si). The residual 70-90% of the silicon releases more slowly during the establishment of the adult plant (FIG. 5). Following this successful demonstration, it should be clear to one of ordinary skill that other systems can be exploited.

The stoichiometry of the detailed reaction mechanism of the nanoparticle dissolution (not showing any of the intermediate steps) is as follows:

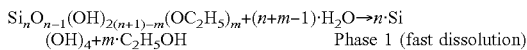
$$Si_nO_{n-1}(OH)_{2(n+1)-m}(OC_2H_5)_m + (n+m-1) \cdot H_2O \rightarrow n \cdot Si(OH)_4 + m \cdot C_2H_5OH \qquad \text{Phase 1 (fast dissolution)}$$

where n>m; n≥1

For clarity, the reaction mechanism is limited to linear unbranched silica oligomers. Under realistic conditions, cyclic and branched silica oligomers can react analogously.

$$SiO_2 + 2H_2O \rightarrow Si(OH)_4 \qquad \text{Phase 2 (slow dissolution)}$$

For clarity, possible hydration and hydrolysis steps to convert the siloxane networks into silanols are omitted, but are the main reason for the slow dissolution kinetics of this second reaction step. More details about the dissolution mechanism of Phase 2 is available in Croissant, J. G.; Fatieiev, Y.; Khashab, N. M., Degradability and Clearance of Silicon, Organosilica, Silsesquioxane, Silica Mixed Oxide, and Mesoporous Silica Nanoparticles. *Adv Mater* 2017, 29, (1604634). It is important to note that both reactions (Phase 1 and 2) can be catalyzed by non-neutral pH conditions as they occur in the plant phyllosphere and rhizosphere (FIG. 10).

Finally, a dissolution experiment demonstrates the advantage of the $SiO_2$-NPs in this application compared to commercially available diatomite (plant-based amorphous silica microparticles). Diatomite and $SiO_2$-NP suspensions were stirred for three days in 0.1 M KOH at equal concentrations (10 g $L^{-1}$). After centrifugation, a pellet of diatomite remains in the conical tube, while the $SiO_2$-NPs produced using the proposed method are completely gone, revealing the more rapid dissolution visually in FIG. 8.

EXAMPLE 4

*Medicago sativa* (alfalfa) Germination and Soil Growth Tests

Independent 60 seed to 800 seed germination tests were conducted following standard seed testing protocols. Briefly, the seeds were placed on filter paper wettened with the active ingredient solution or nanoparticle suspension under investigation and germinated for 5-10 days. The infection of seeds with fungi and bacteria, and the germination rates were determined by counting the infested and germinated seeds, respectively. The germination speed was assessed by counting all fully emerged cotyledons. Blanks (water only) and dissolved silicon control (orthosilicic acid solution) were run in parallel to all experiments in 3-8 replicates. As a positive control, a solution of the commercially available fungicide tebuconazole was run in parallel. The $SiO_2$-NP exposed plants were embedded in low viscosity epoxy resin for transmission electron microscopy imaging.

A plant growth test in standard soil (type 2.2, sandy loam, LUFA Speyer, Germany) was conducted on the seedlings surviving the germination tests to assess the long-term implications of $SiO_2$-NPs on the plants' biomass (66 days, 16:8 day:night cycle, 24±2° C.).

Beneficial effects of $SiO_2$-NPs were found for the fungal infection, germination speed reflected by cotyledon emergence, seed vigor, and biomass (FIGS. 9 and 10) that were highest for the silica oligomer-coated $SiO_2$-NPs. The conventional fungicide, in comparison, while killing all fungi, exhibited toxicity to the seeds, and thus had a less beneficial effect on the total plant viability. Dissolved orthosilicic acid performed equally or worse compared to the nanoparticles. The effect on the biomass was highest in roots, and increased in a concentration-dependent manner with the amount of silica mono- and/or oligomers coated on the nanoparticles.

EXAMPLE 5

*Arabidopsis* Systemic Acquired Resistance Experiments

To illustrate plant defense priming by nanoparticles and applicability of the uncoated $SiO_2$-NPs on the widely used model plant *Arabidopsis thaliana*, systemic acquired resistance assays were conducted (FIG. 11). The measured endpoint was infection of the plants with *Pseudomonas* as quantified by counts of fluorescent units (CFU) in leaf disks. The degree of infection was quantified at the time point of artificial infection (0 dpi) and 3 d post-infection (3 dpi). As a positive control, approx. 4-week-old plants were infected with a *Pseudomonas* avrRpt2 mutant that is known to trigger systemic acquired resistance. Leaves of plants were infused with $SiO_2$-NP suspension, and in control plants with an equally concentrated $MgCl_2$ solution (the buffer used for the *Pseudomonas* avrRpt2 exposure). Three days after infection, and after re-infection of all plants including the controls with *Pseudomonas*, the results show that in presence of uncoated $SiO_2$-NPs, a strong resistance against *Pseudomonas* has developed as reflected by the more than 10× lower infection of the plants with these bacteria, confirming the defense-enhancing effect of the $SiO_2$-NPs for *Arabidopsis*. This resistance was comparable to the resistance observed in the positive control where systemic acquired resistance had been triggered by *Pseudomonas* avrRpt2.

In summary, the results of the plant experiments confirm the protective effects of the $SiO_2$-NPs produced by the method in this application, linked to the two-phase release of orthosilicic acid from rapidly cleaved silica oligomers within hours to days, and from the $SiO_2$-NP core within days to months. The main advantages are:

Silicon is acting as a phytostimulative micronutrient.

Due to the two-phase release, the nanoparticles release sufficient silicon during the short early growth period of the plant with long-standing effects lasting into the adulthood of the plants.

Additional beneficial effects of a facultative active ingredient associated with the $SiO_2$-NPs.

A third beneficial effect is the nanopriming that occurred, e.g., when the nanoparticles induced a strong and phytoprotective systemic acquired resistance response in the plant (FIG. 11).

While the effects of the $SiO_2$-NPs are on the laboratory scale comparable to conventional yield enhancing substances, the $SiO_2$-NPs produced here degrade tracelessly within a few months at pH 7 (FIG. 6).

At comparable concentrations, less toxicity is induced to seedlings than the conventional fungicide tebuconazole (FIG. 9).

Addendum

For the avoidance of doubt, it is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps. The product/composition consisting of these components may be advantageous in that it offers a simpler, more economical process for the preparation of the product/composition. The process consisting of these steps may be advantageous in that it offers a simpler, more economical process.

In accordance with the patent statues, the best mode and preferred embodiments have been set forth, the scope of the invention is not limited thereto, but rather by the scope of the attached claims.

What is claimed is:

1. A one-pot method for producing controlled release silica-based nanoparticles for plant defense and growth enhancement, comprising the steps of:
- forming a predominantly amorphous, hydroxylated, round or substantially round silica-based core during a process that includes precipitation, wherein the core (domain A) has a first release rate under a release condition; and
- enriching the core with silica-containing mono- and/or oligomers (domain B) in nanodomains formed during the precipitation process in the core, and/or coating the silica-containing mono- and/or oligomers on the surface of the nanoparticles, the silica-containing mono- and/or oligomers having a faster second release rate, under the release condition, that is faster than the first release rate, thereby producing the nanoparticles,
- wherein the silica-containing mono and/or oligomers (domain B) is associated with the core (domain A) without the use of a fixant,
- wherein the silica-containing mono- and/or oligomers are present a) in an amount from about 1 to about 70 wt. % based on the total weight of the nanoparticles and/or b) at a ratio of 1:10 to 10:1, mono- and/or oligomers: core, and
- wherein the nanoparticles have a particle size that ranges from about 1 to about 500 nm in diameter measured by transmission electron microscopy.

2. The method according to claim 1, further including the step of partially or fully replacing the silica-containing mono- and/or oligomers in the nanodomains and/or on the nanoparticles surface with one or more other active ingredients.

3. The method according to claim 2, further including the step of washing the nanoparticles in water or another solvent to remove tunable amounts of the silica-containing mono- and/or oligomers,
- by one or more of centrifugation and re-suspension in washing liquid,
- settling and re-suspension in washing liquid, and/or,
- dialysis in washing liquid.

4. A method of using the nanoparticles to enhance the defense and growth of a plant or seed, comprising the steps of:
- producing the nanoparticles according to claim 3;
- applying the nanoparticles, to yield plant growth and defense enhancement, to one or more of a part of the plant or seed, and/or growing medium containing the plant or seed, including soil, spray, irrigation, hydroponic, granulate, and/or seedcoating applications,
- for slow release of active ingredient(s) upon contact with plant or seed parts and under release conditions enhancing the growth and defense of plants and/or seeds by the controlled release of the nutrient orthosilicic acid by hydrolytic cleavage, optionally acid or base catalyzed, of orthosilicic acid from the silica core (domain A) and/or the silicon containing mono- and/or oligomers (domain B),
- additionally enhancing the growth and defense of plants by the upregulation of plant defenses including but not limited to systemic acquired resistance, due to the nature of the shape and size of the nanoparticles creating a mechanic stimulus or effect in the plant that triggers this response.

5. The method according to claim 4,
- and additionally enhancing the growth and defense of plants and/or seeds by the controlled release of further active ingredients entrapped, imbibed, or coated in or on the nanoparticles.

6. The method according to claim 4, further including mixing the nanoparticles with one or more agrochemicals.

7. The method according to claim 4, further including mixing the nanoparticles with one or more of an active ingredient to coat the substances on the nanoparticle, or entrap/imbibe the active ingredient inside the nanoparticles to create domains B for slow release of the active ingredient upon contact with plant or seed parts and under release conditions
- to enhance the growth and defense of plants and/or seeds additionally by the controlled release of the active ingredients entrapped, imbibed, or coated in or on the nanoparticles.

8. A composition prepared by the process according to claim 4.

9. The method according to claim 2, wherein the silica-containing mono- and/or oligomers and/or active ingredients are present in an amount from 10 to 70 wt. % based on the total weight of the nanoparticles, and wherein the nanoparticles have a size that ranges from 20 to 200 nm in diameter.

10. The method according to claim 9, wherein the silica-containing mono- and/or oligomers and/or active ingredients are present in an amount from 25 to 60 wt. % based on the total weight of the nanoparticles, and wherein the nanoparticles have a size that ranges from 40 to 150 nm in diameter.

11. The method according to claim 1, further comprising the steps of:
- performing a polycondensation reaction in a liquid mixture comprising precipitated orthosilicic acid or $Si(OR)_4$ wherein R is an alkyl group, or a combination thereof, to form the core;
- within the same reaction mixture, enriching the silica mono- and/or oligomers and/or active ingredient(s) in the core in nanodomains, and/or in/on the core during a self-sharpening step, thereby forming the nanoparticles; and
- recovering the nanoparticles from the mixture.

12. The method according to claim 11, wherein during the self-sharpening step of the reaction, the nanoparticles are accumulating additional silica mono- and/or oligomers by residence in the reaction mixture, and/or active ingredients added to the reaction mixture, by non-covalent interactions, or covalent hydrolytically cleavable bonds, in or on the core, wherein the accumulation comprises one or more of filling nanopores of the core (domain A) with one or more active ingredient thereby forming nanodomains possessing the second release rate (domain B), adsorbing the active ingredient(s) to the core, and bonding the active ingredient(s) to the core.

13. The method according to claim 11, wherein the polycondensation reaction mixture comprises at least silica mono- and/or oligomers, or orthosilicic acid, or an alcohol (ROH); a catalytic acid, or a base and water, wherein the polycondensation mixture is i) heated to a temperature of from 5° C. to 95° C. and stirred for 10 min to 24 hours, or ii) forced through a channel or porous membrane.

14. The method according to claim 13, wherein the nanoparticles are produced by a micro- or macrofluidic process.

15. The method according to claim 1, further including the step of washing the nanoparticles in water or another solvent to remove tunable amounts of the silica-containing mono- and/or oligomers,
by one or more of centrifugation and re-suspension in washing liquid,
settling and re-suspension in washing liquid, and/or,
dialysis in washing liquid.

16. A method according to claim 1, wherein the release condition is one or more of exposure to rain, exposure to irrigation water, and a pH change occurring in the plant rhizosphere.

17. A composition prepared by the process according to claim 1.

18. A method of using the nanoparticles to enhance the defense and growth of a plant or seed, comprising the steps of:
producing the nanoparticles according to claim 1;
applying the nanoparticles, to yield plant growth and defense enhancement, to one or more of a part of the plant or seed, and/or growing medium containing the plant or seed, including soil, spray, irrigation, hydroponic, granulate, and/or seedcoating applications,
for slow release of active ingredient(s) upon contact with plant or seed parts and under release conditions enhancing the growth and defense of plants and/or seeds by the controlled release of the nutrient orthosilicic acid by hydrolytic cleavage, optionally acid or base catalyzed, of orthosilicic acid from the silica core (domain A) and/or the silicon containing mono- and/or oligomers (domain B),
additionally enhancing the growth and defense of plants by the upregulation of plant defenses including but not limited to systemic acquired resistance, due to the nature of the shape and size of the nanoparticles creating a mechanic stimulus or effect in the plant that triggers this response.

19. The method according to claim 18,
and additionally enhancing the growth and defense of plants and/or seeds by the controlled release of further active ingredients entrapped, imbibed, or coated in or on the nanoparticles.

20. The method according to claim 18, further including mixing the nanoparticles with one or more agrochemicals.

21. The method according to claim 18, further including mixing the nanoparticles with one or more of an active ingredient to coat the substances on the nanoparticle, or entrap/imbibe the active ingredient inside the nanoparticles to create domains B for slow release of the active ingredient upon contact with plant or seed parts and under release conditions,
to enhance the growth and defense of plants and/or seeds additionally by the controlled release of the active ingredients entrapped, imbibed, or coated in or on the nanoparticles.

* * * * *